(12) United States Patent
Takahata et al.

(10) Patent No.: US 12,366,344 B2
(45) Date of Patent: Jul. 22, 2025

(54) ILLUMINATION DEVICE

(71) Applicant: Japan Display Inc., Tokyo (JP)

(72) Inventors: Masashi Takahata, Tokyo (JP); Takeo Koito, Tokyo (JP); Hiroyuki Wakana, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/648,114

(22) Filed: Apr. 26, 2024

(65) Prior Publication Data

US 2024/0295305 A1   Sep. 5, 2024

Related U.S. Application Data

(63) Continuation of application No. PCT/JP2022/033664, filed on Sep. 8, 2022.

(30) Foreign Application Priority Data

Nov. 2, 2021   (JP) .................................. 2021-179490

(51) Int. Cl.
| | |
|---|---|
| F21V 9/40 | (2018.01) |
| F21V 23/04 | (2006.01) |
| F21Y 113/00 | (2016.01) |
| G02F 1/1333 | (2006.01) |
| H05B 47/13 | (2020.01) |

(52) U.S. Cl.
CPC ............ F21V 9/40 (2018.02); F21V 23/0471 (2013.01); H05B 47/13 (2020.01); *F21Y 2113/30* (2023.05); *G02F 1/133308* (2013.01)

(58) Field of Classification Search
CPC ........ F21V 23/0471; F21V 9/40; H05B 47/13
See application file for complete search history.

(56) References Cited

U.S. PATENT DOCUMENTS

| | | | |
|---|---|---|---|
| 9,756,265 B2* | 9/2017 | Kuboyama | ............ H04N 23/61 |
| 10,845,672 B2* | 11/2020 | Galstian | .................... G02F 1/29 |
| 11,086,150 B2* | 8/2021 | You | ...................... G02F 1/13471 |
| 2019/0196263 A1* | 6/2019 | Chen | .................... G02F 1/13471 |
| 2021/0338859 A1* | 11/2021 | Yu | ............................. A61L 2/10 |

FOREIGN PATENT DOCUMENTS

| | | |
|---|---|---|
| JP | 2019-169340 A | 10/2019 |
| JP | 2021-122262 A | 8/2021 |

OTHER PUBLICATIONS

Search report issued in related International Patent Application No. PCT/JP2022/033664 mailed on Oct. 18, 2022, and English translation of same. 5 pages.

(Continued)

*Primary Examiner* — Matthew J. Peerce
(74) *Attorney, Agent, or Firm* — K&L Gates LLP

(57) ABSTRACT

According to an aspect, an illumination device includes: a light distribution controller having a light distribution control region in which a transmission region of light is changeable; a plurality of types of light sources each disposed at a position facing the light distribution controller; and a controller configured to control operation of the light distribution controller and the plurality of types of light sources. The light distribution controller includes a plurality of liquid crystal panels stacked in a facing direction of the light distribution controller and the light source.

8 Claims, 16 Drawing Sheets

(56) References Cited

OTHER PUBLICATIONS

Written Opinion issued in related International Patent Application No. PCT/JP2022/033664 mailed on Oct. 18, 2022. 3 pages.
Office Action issued in related Japanese Patent Application No. 2023-557637, mailed on Oct. 1, 2024 and English translation of same. 6 pages.

* cited by examiner

FIG.5
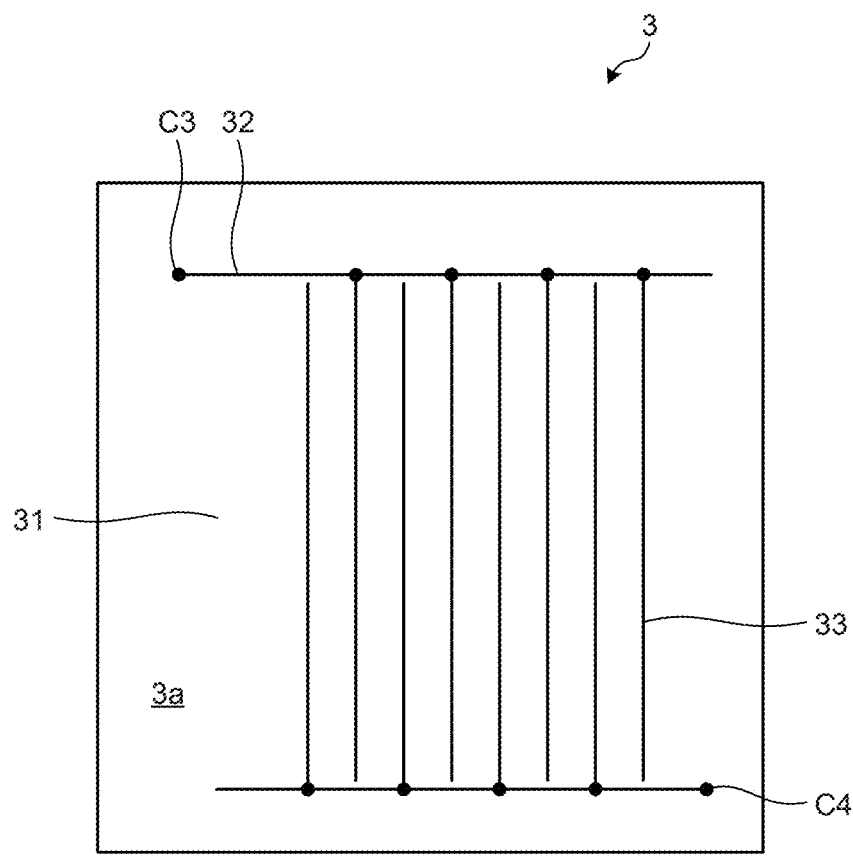
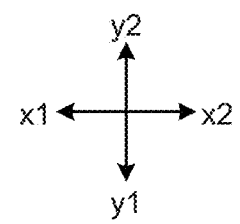

ILLUMINATION DEVICE

CROSS-REFERENCE TO RELATED APPLICATION

This application claims the benefit of priority from Japanese Patent Application No. 2021-179490 filed on Nov. 2, 2021 and International Patent Application No. PCT/JP2022/033664 filed on Sep. 8, 2022, the entire contents of which are incorporated herein by reference.

BACKGROUND

1. Technical Field

What is disclosed herein relates to an illumination device.

2. Description of the Related Art

As described in Japanese Patent Application Laid-open Publication No. 2021-122262 (JP-A-2021-122262), it is known that there is an illumination device the orientation of which is changeable so that the emission region of light can be changed.

In a case where a plurality of types of light sources are desired to be provided in the illumination device disclosed in JP-A-2021-122262, movable components and drivers need to be provided so that the orientation of each light source can be changed. With such a configuration, the size of the illumination device unavoidably increases, and a space in which operation of the illumination device is allowed is needed around the illumination device. Therefore, it is difficult to employ the configuration.

For the foregoing reasons, there is a need for an illumination device that can more easily control light distribution of a plurality of types of light sources.

SUMMARY

According to an aspect, an illumination device includes: a light distribution controller having a light distribution control region in which a transmission region of light is changeable; a plurality of types of light sources each disposed at a position facing the light distribution controller; and a controller configured to control operation of the light distribution controller and the plurality of types of light sources. The light distribution controller includes a plurality of liquid crystal panels stacked in a facing direction of the light distribution controller and the light source.

BRIEF DESCRIPTION OF THE DRAWINGS

FIG. 5 is a plan view illustrating wiring of a counter substrate according to the embodiment when viewed from above;

DETAILED DESCRIPTION

Each embodiment of the present disclosure will be described below with reference to the accompanying drawings. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit the interpretation of the present disclosure. In the present specification and drawings, any element same as that already described with reference to an already described drawing is denoted by the same reference sign, and detailed description thereof is omitted as appropriate in some cases.

Figure 1:
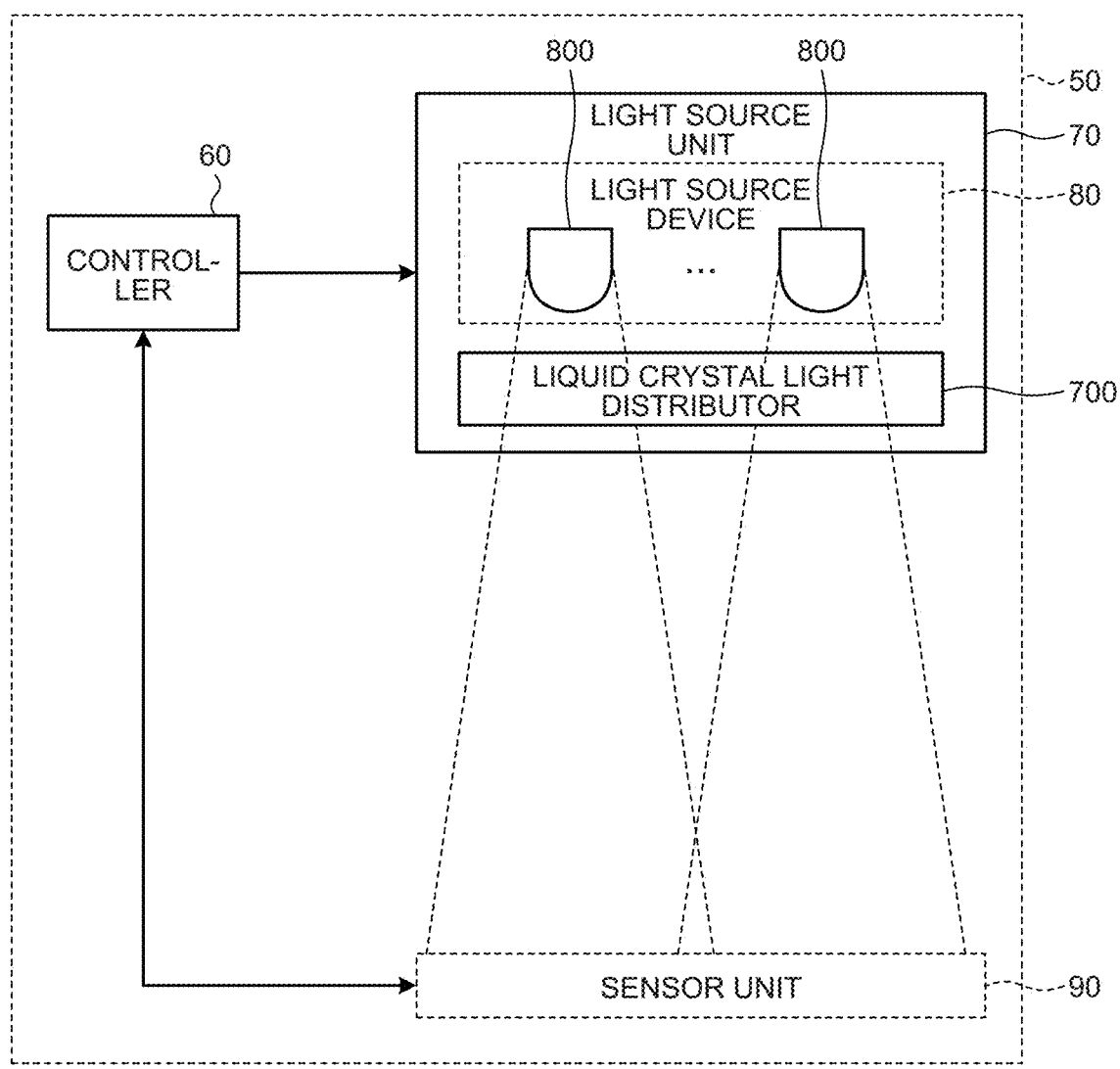
FIG. 1 is a schematic diagram illustrating a main configuration of an illumination device.

FIG. 1 is a schematic diagram illustrating a main configuration of an illumination device 50. The illumination device 50 includes a light source unit 70, a sensor unit 90, and a controller 60. The light source unit 70 includes a light source device 80 and a liquid crystal light distributor 700. The light source device 80 includes a plurality of light sources 800.

The illumination device 50 is an illumination device provided to allow individual control of an emission region (light distribution region) of light from each of the plurality of light sources 800 by using the liquid crystal light distributor 700. Each light source 800 is, for example, any of a first light source 801, a second light source 802, a third light source 803, and a composite light source 810 to be described later. Light emitted from the plurality of light sources 800 through the liquid crystal light distributor 700 is detected by the sensor unit 90. The controller 60 is provided so as to enable feedback control to control operation of the light source unit 70 based on light detected by the sensor unit 90.

Figure 2:
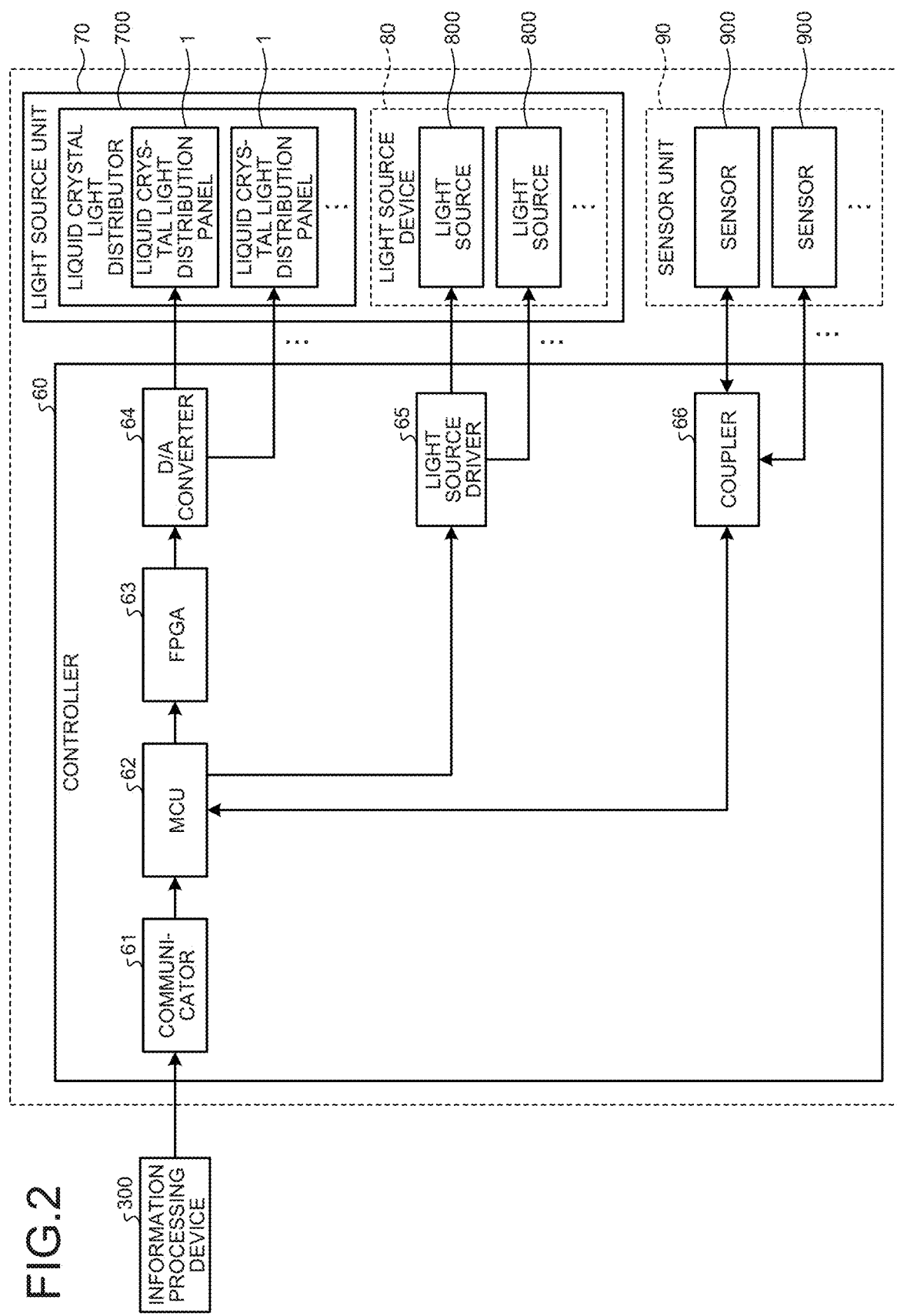
FIG. 2 is a block diagram illustrating a main configuration of a controller and the relation between components included in the controller, a light source unit, and a sensor unit.

FIG. 2 is a block diagram illustrating a main configuration of the controller 60 and the relation between components included in the controller 60, the light source unit 70, and the sensor unit 90. The controller 60 includes a communicator 61, a micro controller unit (MCU) 62, a field programmable gate array (FPGA) 63, a digital-to-analog (D/A) converter 64, and a light source driver 65, and a coupler 66.

The communicator 61 performs communication with an external information processing device 300. Specifically, the communicator 61 includes, for example, a circuit that functions as a network interface controller (NIC). The communicator 61 receives a signal transmitted from the information processing device 300 and including a command related to operation of the illumination device 50 and outputs information indicating the command to the MCU 62. The information processing device 300 is a portable terminal device such as a smartphone but not limited thereto. The information processing device 300 may be a stationary information processing device such as a server or a personal computer (PC) provided for control of the illumination device 50 or may be an information processing device in another form not exemplarily described herein.

The command related to the operation of the illumination device 50 and transmitted from the information processing device 300 is a command that specifies ON/OFF of light emission by the illumination device 50, a light emission region, light intensity, or the like. The command, however, is not limited thereto and may include anything that can be individually specified within an operation control range of the illumination device 50.

The MCU 62 outputs various signals to the FPGA 63, the light source driver 65, and the coupler 66 in accordance with the command related to the operation of the illumination device 50 and obtained from the information processing device 300 through the communicator 61. In other words, the MCU 62 controls various components included in the controller 60 so that the illumination device 50 operates in accordance with the command from the information processing device 300.

Under control by the MCU 62, the FPGA 63 performs information processing for controlling the operation of the liquid crystal light distributor 700 and outputs a signal indicating a result of the information processing to the D/A converter 64. For example, in a case where designation related to a light emission region is included in the command related to the operation of the illumination device 50 and transmitted from the information processing device 300, the FPGA 63 performs information processing for operating the liquid crystal light distributor 700 so that light is emitted to the emission region corresponding to the designation.

The D/A converter 64 has a configuration that outputs, based on a digital signal that is a signal from the FPGA 63, an analog signal for operating a plurality of liquid crystal light distribution panels 1 included in the liquid crystal light distributor 700. The configuration may be composed of one circuit or may include a plurality of circuits.

The light source driver 65 is a controller that performs, under control by the MCU 62, ON/OFF control of the plurality of light sources 800 included in the light source device 80 and light emission intensity control when the light sources 800 are ON. The controller may be composed of one circuit or may include a plurality of circuits.

The coupler 66 is an interface interposed between the MCU 62 and a plurality of sensors 900 included in the sensor unit 90. The coupler 66 is coupled to the MCU 62. The coupler 66 is also coupled to the plurality of sensors 900. The coupler 66 transmits a signal output from the MCU 62 to the plurality of sensors 900 included in the sensor unit 90. Each sensor 900 is, for example, an infrared (IR) sensor 901 or an illuminance sensor 902 to be described later.

Each liquid crystal light distribution panel 1 included in the liquid crystal light distributor 700 will be described below with reference to FIGS. 3 to 7.

Figure 3:
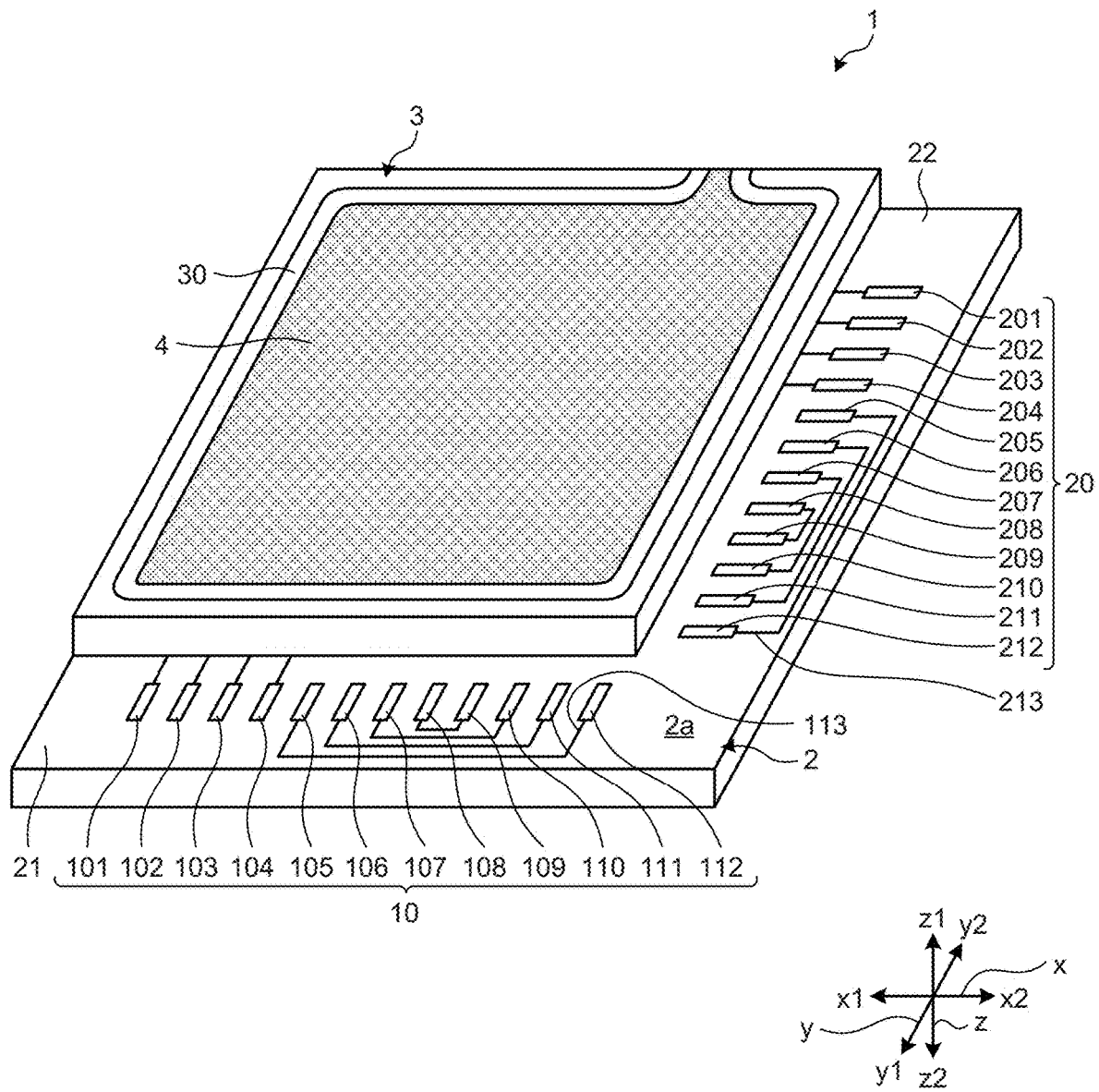
FIG. 3 is a perspective view of a light control panel according to an embodiment.
Figure 4:
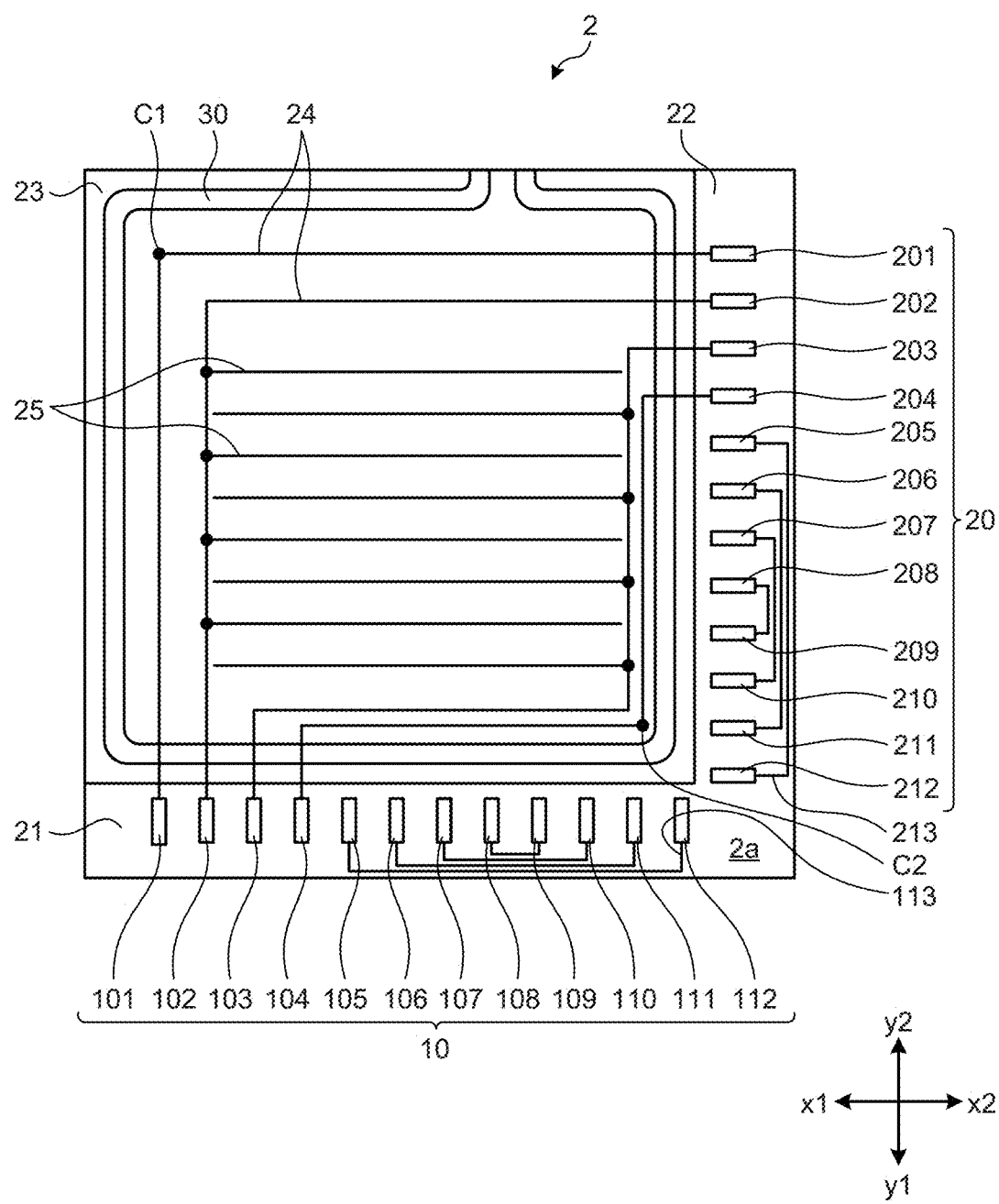
FIG. 4 is a plan view illustrating wiring of an array substrate according to the embodiment when viewed from above.
Figure 6:
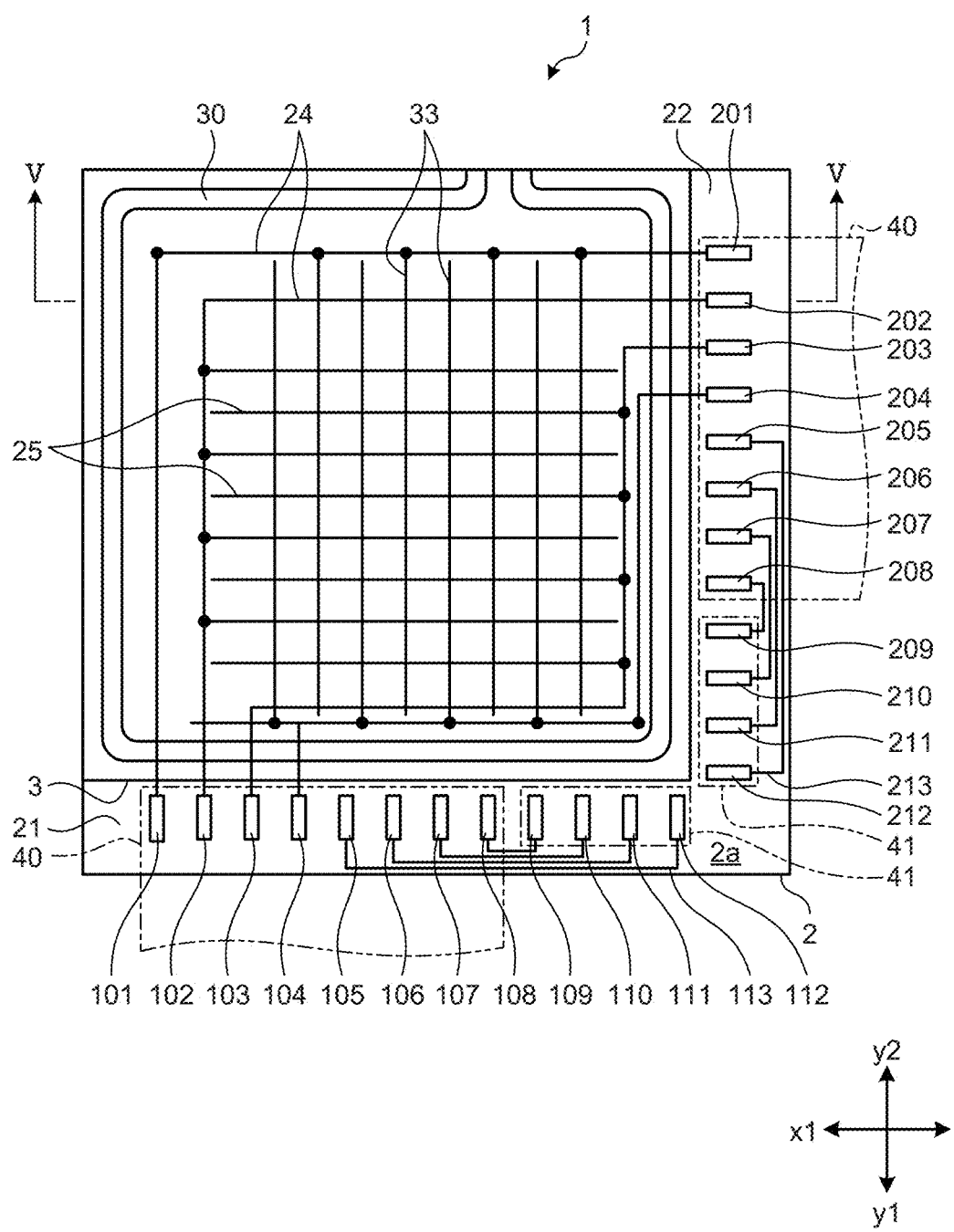
FIG. 6 is a plan view illustrating wiring of the light control panel according to the embodiment when viewed from above.
Figure 7:
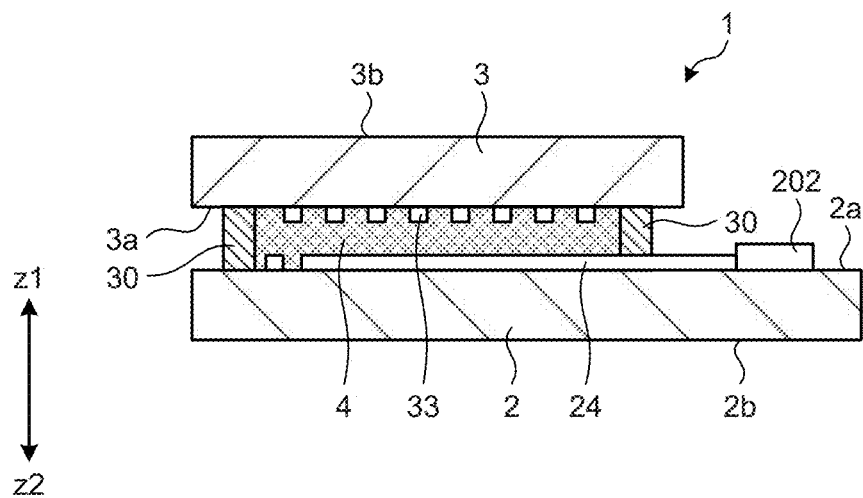
FIG. 7 is a sectional view along line V-V in FIG. 6.

FIG. 3 is a perspective view of a light control panel according to an embodiment. FIG. 4 is a plan view illustrating wiring of an array substrate according to the embodiment when viewed from above. FIG. 5 is a plan view illustrating wiring of a counter substrate according to the embodiment when viewed from above. FIG. 6 is a plan view illustrating wiring of the light control panel according to the embodiment when viewed from above. FIG. 7 is a sectional view along line V-V in FIG. 6. In an xyz coordinate system illustrated in FIGS. 3 to 6, a direction along an x1 direction and an x2 direction is referred to as an x direction. The x1 direction is opposite to the x2 direction. A direction along a y1 direction and a y2 direction is referred to as a y direction. The y1 direction is opposite to the y2 direction. A direction along a z1 direction and a z2 direction is referred to as a z direction. The z1 direction is opposite to the z2 direction. The x direction is orthogonal to the y direction. A plane along the x direction and the y direction is orthogonal to the z direction.

As illustrated in FIG. 3, each liquid crystal light distribution panel 1 includes an array substrate 2, a counter substrate 3, a liquid crystal layer 4, and a seal member 30.

As illustrated in FIGS. 3 and 6, the array substrate (first substrate) 2 is larger than the counter substrate (second substrate) 3. In other words, the area of the counter substrate (second substrate) 3 is smaller than the area of the array substrate (first substrate) 2. The array substrate 2 includes a transparent glass 23 (refer to FIG. 4). The counter substrate 3 includes a transparent glass 31 (refer to FIG. 5). In the embodiment, the array substrate 2 and the counter substrate 3 each have a square shape in a plan view from above, but the shape of each substrate according to the present invention is not limited to a square shape. A first terminal group area 21 and a second terminal group area 22 are provided on a front surface 2a of the array substrate 2. The first terminal group area 21 is positioned at an end part of the front surface 2a of the array substrate 2 on the y1 side. The second terminal group area 22 is positioned at an end part of the front surface 2a of the array substrate 2 on the x2 side. The first terminal group area 21 and the second terminal group area 22 form an L shape when viewed from above. A first terminal group 10 is disposed in the first terminal group area 21, and a second terminal group 20 is disposed in the second terminal group area 22. Since the area of the counter substrate 3 is smaller than the area of the array substrate 2, the first terminal group 10 and the second terminal group 20 are exposed. The first terminal group 10 and the second terminal group 20 are also simply referred to as terminal portions.

As illustrated in FIGS. 3 and 6, the first terminal group 10 includes a first terminal 101, a second terminal 102, a third terminal 103, a fourth terminal 104, a first pad 105, a second pad 106, a third pad 107, a fourth pad 108, a fifth pad 109, a sixth pad 110, a seventh pad 111, and an eighth pad 112.

The first terminal 101, the second terminal 102, the third terminal 103, the fourth terminal 104, the first pad 105, the second pad 106, the third pad 107, the fourth pad 108, the fifth pad 109, the sixth pad 110, the seventh pad 111, and the eighth pad 112 are sequentially arranged in a right-left direction from the x1 side toward the x2 side. The first pad 105 and the eighth pad 112 are electrically coupled to each other through a lead line 113. The second pad 106 and the seventh pad 111 are electrically coupled to each other through a lead line 113. The third pad 107 and the sixth pad 110 are electrically coupled to each other through a lead line 113. The fourth pad 108 and the fifth pad 109 are electrically coupled to each other through a lead line 113.

As illustrated in FIGS. 3 and 6, the second terminal group 20 includes a fifth terminal 201, a sixth terminal 202, a seventh terminal 203, an eighth terminal 204, a ninth pad 205, a tenth pad 206, an eleventh pad 207, a twelfth pad 208, a thirteenth pad 209, a fourteenth pad 210, a fifteenth pad 211, and a sixteenth pad 212. The fifth terminal 201, the sixth terminal 202, the seventh terminal 203, the eighth terminal 204, the ninth pad 205, the tenth pad 206, the eleventh pad 207, the twelfth pad 208, the thirteenth pad 209, the fourteenth pad 210, the fifteenth pad 211, and the sixteenth pad 212 are sequentially arranged in a front-back direction from the y2 side toward the y1 side. The ninth pad 205 and the sixteenth pad 212 are electrically coupled to each other through a corresponding one of lead lines 213. The tenth pad 206 and the fifteenth pad 211 are electrically coupled to each other through a corresponding one of the lead lines 213. The eleventh pad 207 and the fourteenth pad 210 are electrically coupled to each other through a corresponding one of the lead lines 213. The twelfth pad 208 and the thirteenth pad 209 are electrically coupled to each other through a corresponding one of the lead lines 213.

As illustrated in FIG. 3, the counter substrate 3 is disposed on an upper side (z1 side) relative to the array substrate 2. The seal member 30 and the liquid crystal layer 4 are provided between the counter substrate 3 and the array substrate 2. The seal member 30 is provided in an annular shape along the outer periphery of the counter substrate 3, and the inside of the seal member 30 is filled with the liquid crystal layer 4. A region in which the liquid crystal layer 4 is provided is an active region, the outside of the liquid crystal layer 4 is a frame region, and the first terminal group area 21 and the second terminal group area 22 are terminal regions.

Wiring of the array substrate 2 and the counter substrate 3 will be described below. As illustrated in FIG. 7, wiring is provided on a front surface of each substrate. In other words, a surface on which wiring is provided is referred to as a front surface, and a surface opposite to the front surface is referred to as a back surface. Specifically, as illustrated in FIG. 7, of the front surface 2a and a back surface 2b of the array substrate 2, the front surface 2a on the upper side is provided with wiring; whereas, of a front surface 3a and a back surface 3b of the counter substrate 3, the front surface 3a on the lower side is provided with wiring. In this manner, the front surface 2a of the array substrate 2 and the front surface 3a of the counter substrate 3 are disposed facing each other with the liquid crystal layer 4 interposed therebetween.

As illustrated in FIG. 4, wiring lines 24 and first electrodes 25 are provided on the front surface 2a of the transparent glass 23 of the array substrate 2. Specifically, the first terminal 101 and the fifth terminal 201 are electrically coupled to each other through a corresponding one of the wiring lines 24. The second terminal 102 and the sixth terminal 202 are electrically coupled to each other through a corresponding one of the wiring lines 24. The third terminal 103 and the seventh terminal 203 are electrically coupled to each other through a corresponding one of the wiring lines 24. The fourth terminal 104 and the eighth terminal 204 are electrically coupled to each other through a corresponding one of the wiring lines 24. More than one of the first electrodes 25 are coupled to the wiring line 24 coupling the second terminal 102 and the sixth terminal 202. More than one of the first electrodes 25 are coupled to the wiring line 24 coupling the third terminal 103 and the seventh terminal 203. The wiring lines 24 are provided with couplers C1 and C2.

As illustrated in FIG. 5, wiring lines 32 and second electrodes 33 are provided on the front surface 3a of the counter substrate 3. Specifically, the wiring lines 32 are provided on the y1 side and the y2 side, respectively. The wiring lines 32 extend in the x direction. The second electrodes 33 are electrically coupled to the wiring lines 32. The second electrodes 33 extend in the y direction. The wiring lines 32 are provided with couplers C3 and C4. In the example illustrated in FIGS. 4 to 6, the number of the first electrodes 25 and the number of the second electrodes 33 are eight, but these numbers are schematic examples and are not necessarily the actual numbers of the first electrodes 25 and second electrodes 33. The number of the first electrodes 25 and the number of the second electrodes 33 only need to be two or more and thus may be nine or more.

As illustrated in FIGS. 6 and 7, the counter substrate 3 is disposed on the upper side relative to the array substrate 2 with a space therebetween. The space between the array substrate 2 and the counter substrate 3 is filled with the liquid crystal layer 4. The coupler C1 of the array substrate 2 and the coupler C3 of the counter substrate 3 are electrically coupled to each other through a conductive pillar (not illustrated). The coupler C2 of the array substrate 2 and the coupler C4 of the counter substrate 3 are electrically coupled to each other through a conductive pillar (not illustrated).

As illustrated in FIG. 6, the first terminal 101, the second terminal 102, the third terminal 103, the fourth terminal 104, the first pad 105, the second pad 106, the third pad 107, and the fourth pad 108 can be electrically coupled to flexible printed circuits (FPC) 40 illustrated with dashed and double-dotted lines. For example, the liquid crystal light distribution panels 1 are each coupled to the D/A converter 64 through the individually provided FPC 40.

Figure 8:
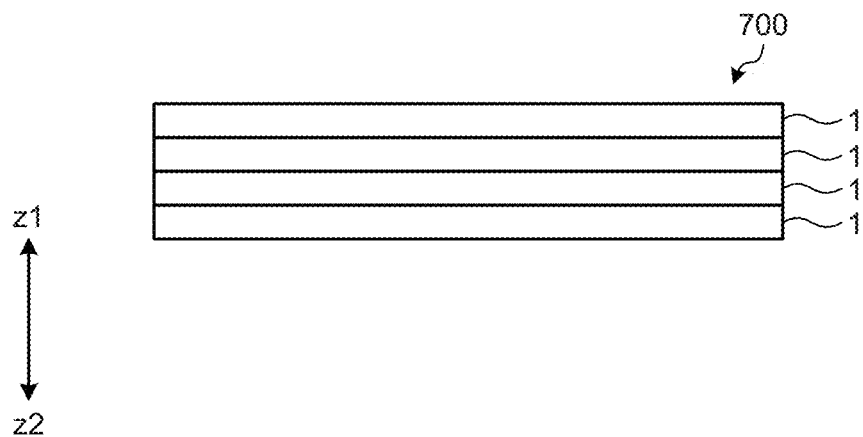
FIG. 8 is a schematic diagram illustrating the configuration of a liquid crystal light distributor.

FIG. 8 is a schematic diagram illustrating the configuration of the liquid crystal light distributor 700. As illustrated in FIG. 8, the liquid crystal light distributor 700 includes, for example, four liquid crystal light distribution panels 1 stacked in the z direction. The four liquid crystal light distribution panels 1 are the liquid crystal light distribution panels 1 described above with reference to FIGS. 3 to 7. The four liquid crystal light distribution panels 1 are stacked such that the liquid crystal layers 4 thereof overlap one another and the plurality of first electrodes 25 and the plurality of second electrodes 33 included in each liquid crystal light distribution panel overlaps those of the others at a plan viewpoint. A plan viewpoint is the viewpoint of a front view of a plane along which the x direction and the y direction extend. A region in which the first electrodes 25 and the second electrodes 33 are disposed, functions as a light distribution control region LDA illustrated in FIG. 9 and the like to be described later.

Figure 9:
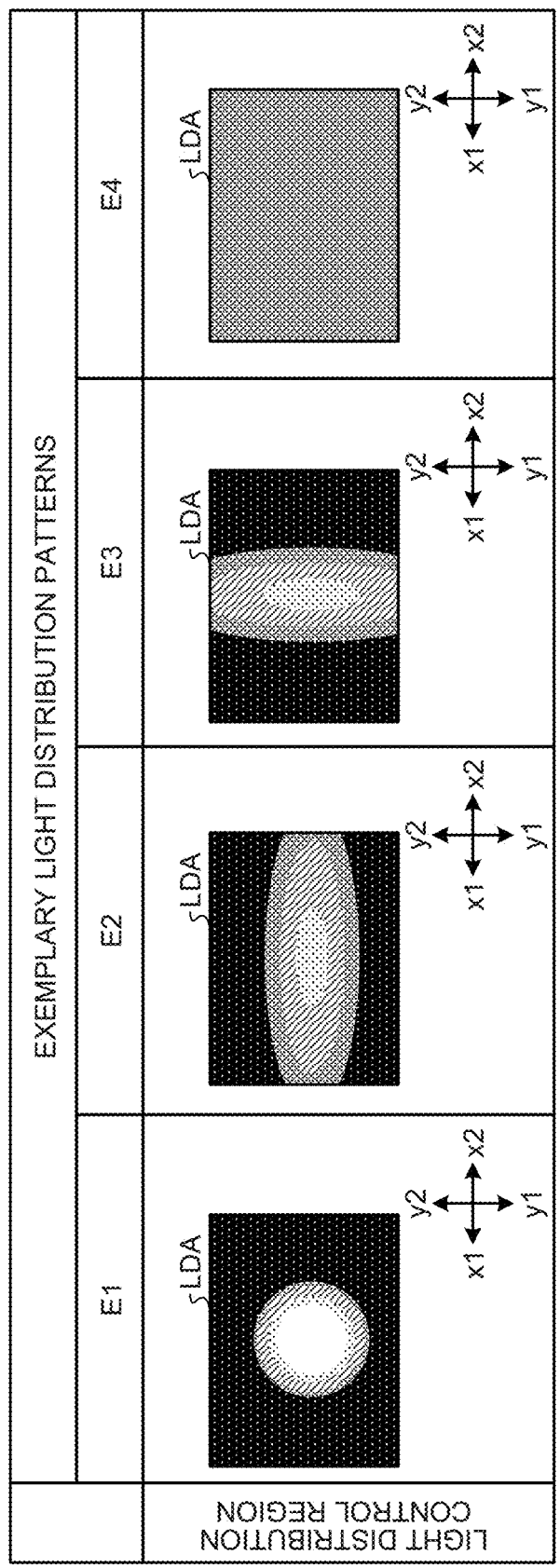
FIG. 9 is a schematic diagram illustrating an example of light distribution control by a light distribution control region.

FIG. 9 is a schematic diagram illustrating an example of light distribution control by the light distribution control region LDA. As described above, the light distribution control region LDA is a region in which the first electrodes 25 and the second electrodes 33 are disposed at a plan viewpoint. In other words, the light distribution control region LDA includes a plurality of electrodes extending in the x direction and arranged in the y direction and a plurality of electrodes extending in the y direction and arranged in the x direction. The electrodes extending in the x direction and arranged in the y direction are, for example, the first electrodes 25. The electrodes extending in the y direction and arranged in the x direction are, for example, the second electrodes 33.

Since the liquid crystal light distributor 700 includes the four liquid crystal light distribution panels 1 are stacked in the z direction, the plurality of electrodes extending in the x direction and arranged in the y direction and the plurality of electrodes extending in the y direction and arranged in the x direction are quadruplicated in the z direction. The light distribution control region LDA can control the transmission region and transmission degree of light traveling from one surface side of the liquid crystal light distributor 700 toward the other surface side thereof as in Examples E1, E2, E3, and E4 as "exemplary light distribution patterns" illustrated in FIG. 9 by controlling the potential of each of the plurality of electrodes extending in the x direction and arranged in the y direction and the plurality of electrodes extending in the y direction and arranged in the x direction of the four liquid crystal light distribution panels 1 included in the liquid crystal light distributor 700.

In the following description, it is assumed that potentials applied to electrodes overlapping each other at a plan viewpoint are equal to each other. Example E1 in FIG. 9 is a schematic pattern illustrating the state of the light distribution control region LDA when viewed at a plan viewpoint from a side facing a light source (for example, the light source 800) in a case where the potentials of the plurality of electrodes extending in the x direction and arranged in the y direction and the plurality of electrodes extending in the y direction and arranged in the x direction are all 0 volt (V). In Example E1, light from the light source transmits through the light distribution control region LDA with almost no change.

Example E2 is a schematic pattern illustrating the state of the light distribution control region LDA when viewed at a plan viewpoint from a side facing a light source (for example, the light source 800) in a case where the potentials of the plurality of electrodes extending in the x direction and arranged in the y direction are 0 volt (V), and the potentials of the plurality of electrodes extending in the y direction and arranged in the x direction exceed 0 volt (V). Example E2 illustrates the state of the light distribution control region LDA when the light distribution is controlled so that, when comparing light spread in the x direction and light spread in the y direction, light from the light source relatively largely spreads in the x direction but does not much spread in the y direction. The phrase "the potentials of the plurality of electrodes extending in the y direction and arranged in the x direction exceed 0 volt (V)" means a state in which the potential of one of adjacent electrodes among the plurality of electrodes arranged in the x direction is 0 volt (V) and the potential of the other exceeds 0 volt (V) whereby electric field influence of the potential difference between the two adjacent electrodes is provided to the liquid crystal layer 4.

Example E3 is a schematic pattern illustrating the state of the light distribution control region LDA when viewed at a plan viewpoint from a side facing a light source (for example, the light source 800) in a case where the potentials of the plurality of electrodes extending in the x direction and arranged in the y direction exceed 0 volt (V) and the potentials of the plurality of electrodes extending in the y direction and arranged in the x direction are 0 volt (V). Example E3 illustrates the state of the light distribution control region LDA when the light distribution is controlled so that, when comparing light spread in the x direction and light spread in the y direction, light from the light source relatively largely spreads in the y direction but does not much spread in the x direction. The phrase "the potentials of the plurality of electrodes extending in the x direction and arranged in the y direction exceeds 0 volt (V)" means a state in which the potential of one of adjacent electrodes among the plurality of electrodes arranged in the y direction is 0 volt (V) and the potential of the other exceeds 0 volt (V) whereby electric field influence of the potential difference between the two adjacent electrodes is provided to the liquid crystal layer 4.

Example E4 is a schematic pattern illustrating the state of the light distribution control region LDA when viewed at a plan viewpoint from a side facing a light source (for example, the light source 800) in a case where the potentials of the plurality of electrodes extending in the x direction and arranged in the y direction and the plurality of electrodes extending in the y direction and arranged in the x direction all exceed 0 volt (V). Example E4 illustrates a state in which light from the light source is significantly blocked by the light distribution control region LDA whereby the light distribution control region LDA becomes entirely dark when viewed from the side facing the light source with the light distribution control region LDA interposed therebetween.

The light distribution control region LDA only needs to include, at a plan viewpoint, two or more electrodes extending in the x direction and arranged in the y direction, and two or more electrodes extending in the y direction and arranged in the x direction. Assume that a first condition is such that one light distribution control region LDA includes m electrodes extending in the x direction and arranged in the y direction, and n electrodes extending in the y direction and arranged in the x direction. Assume that a second condition is such that the number of electrodes (for example, first electrodes 25) extending in the x direction and arranged in the y direction is m×p, and the number of electrodes extending in the y direction and arranged in the x direction (for example, second electrodes 33) is n×q in one liquid crystal light distribution panel 1. With the first and second conditions as a premise, the liquid crystal light distributor 700 can be set in a matrix of rows and columns in which p light distribution control regions LDA are arranged in the x direction and q light distribution control regions LDA are arranged in the y direction. Each of the numbers m, n, p, and q is a natural number of 2 or larger. Alternatively, the entire active region (region in which the liquid crystal layer 4 is provided) included in one liquid crystal light distribution panel 1 at a plan viewpoint may be one light distribution control region LDA.

Examples E1, E2, E3, and E4 in FIG. 9 particularly illustrate variations in the shape of the light distribution region at a plan viewpoint caused by the potential control, but in reality, the shape and size of the light transmission region can be more flexibly controlled because of the relation between the potentials provided to the first electrodes 25 and the potentials provided to the second electrodes 33. The configurations and control described above with reference to FIGS. 3 to 8 are merely exemplary and the present invention is not limited thereto. For example, the first electrodes 25 do not necessarily need to be precisely aligned with the x direction but may extend at an angle with a tilt of several degrees (10° or less) relative to the x direction. The first electrodes 25 do not necessarily need to be arranged at equal intervals in the y direction, but the interval between first electrodes adjacent to each other may be different between the vicinity of both ends of the liquid crystal light distribution panel 1 in the y direction and the vicinity of the center thereof in the y direction. The second electrodes 33 may have a configuration corresponding to description in which "the x direction" and "the y direction" in the above description of the first electrodes 25 are interchanged.

Figure 10:
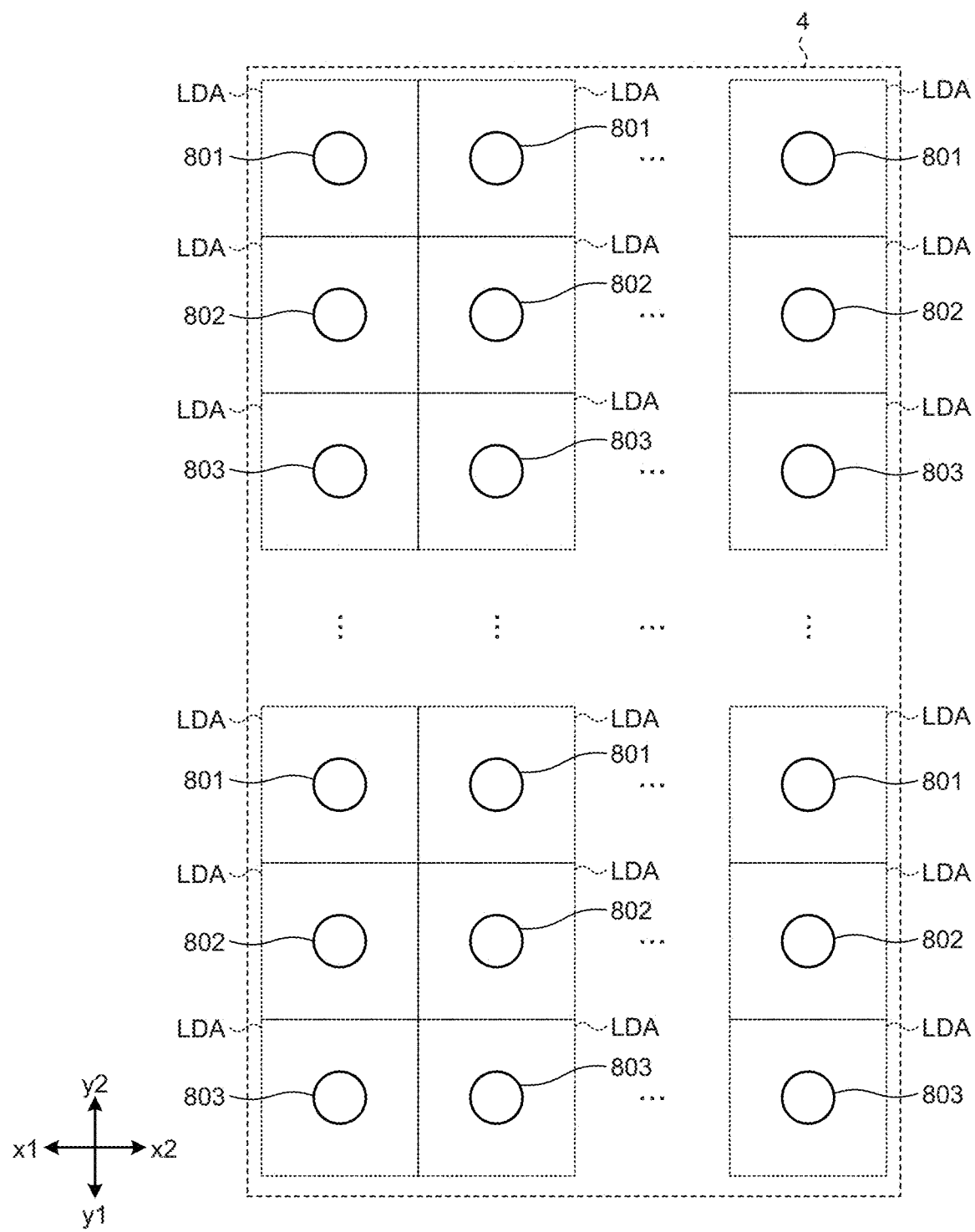
FIG. 10 is a schematic diagram illustrating the relation of the light distribution control regions with first light sources, second light sources, and third light sources at a plan viewpoint.

FIG. 10 is a schematic diagram illustrating the relation of the light distribution control regions LDA with the first light sources 801, the second light sources 802, and the third light sources 803 at a plan viewpoint. As illustrated in FIG. 10, the plurality of light distribution control regions LDA are arranged in a matrix of rows and columns in the embodiment. For example, each liquid crystal light distribution panel 1 is provided with the first electrodes 25 and the second electrodes 33. In the liquid crystal layer 4, regions that each function as one light distribution control region LDA with combination of some of the first electrodes 25 and some of the second electrodes 33 are arranged in a matrix of rows and columns at a plan viewpoint. Thus, in the liquid crystal light distribution panel 1, the first electrodes 25 and the second electrodes 33 are provided corresponding to the regions that each function as a light distribution control region LDA.

Any of one first light source 801, one second light source 802, and one third light source 803 is disposed in one light distribution control region LDA. The first light source 801, the second light source 802, and the third light source 803 emit light having different spectrum peaks, respectively. The first light source 801 mainly emits light of a wavelength included in the visible light range of a human. Light emitted by the first light source 801 is, for example, white light but may be light in a warm color, like light of a light bulb, or may be light in any other color. The second light source 802 emits infrared light. The wavelength of the infrared light is a wavelength that can be detected by the IR sensor 901 to be described later. The third light source 803 emits ultraviolet light. The first light source 801, the second light source 802, and the third light source 803 are, for example, light emitting diodes (LED) but are not limited thereto and may be other light sources.

Each light source 800 described above with reference to FIG. 2 is, for example, any of the first light source 801, the second light source 802, and the third light source 803. In the example illustrated in FIG. 10, a row in which the first light sources 801 are arranged in the x direction, a row in which the second light sources 802 are arranged in the x direction, and a row in which the third light sources 803 are arranged in the x direction are periodically arranged in the y direction, but the types of specific light sources provided as the light sources 800 (for example, first light source 801, second light source 802, and third light source 803) and the arrangement of the light sources are not limited to the example illustrated in FIG. 10.

Figure 11:
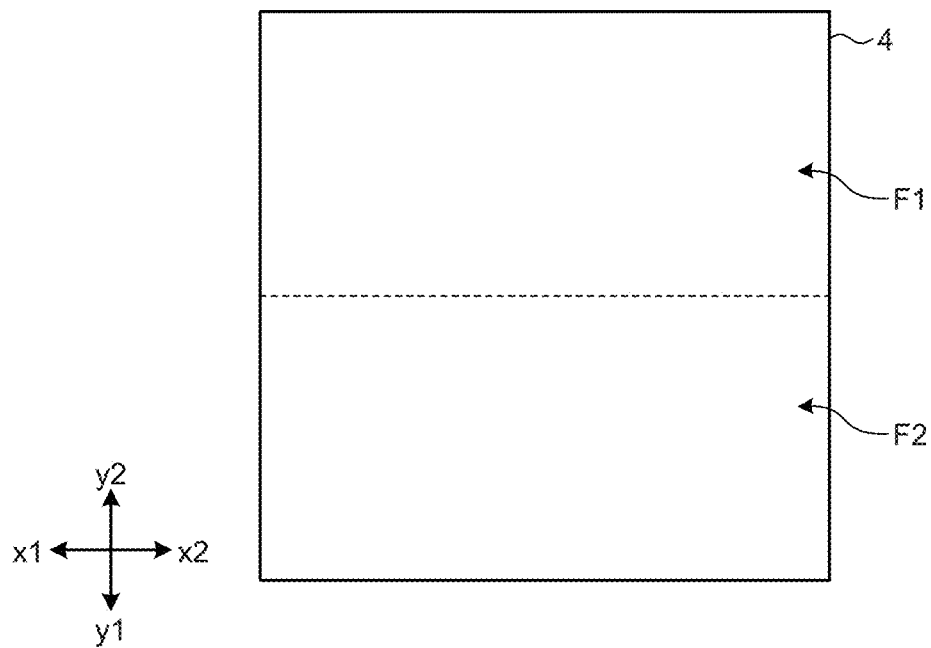
FIG. 11 is a schematic diagram illustrating an example of an arrangement of light sources in a liquid crystal layer.
Figure 12:
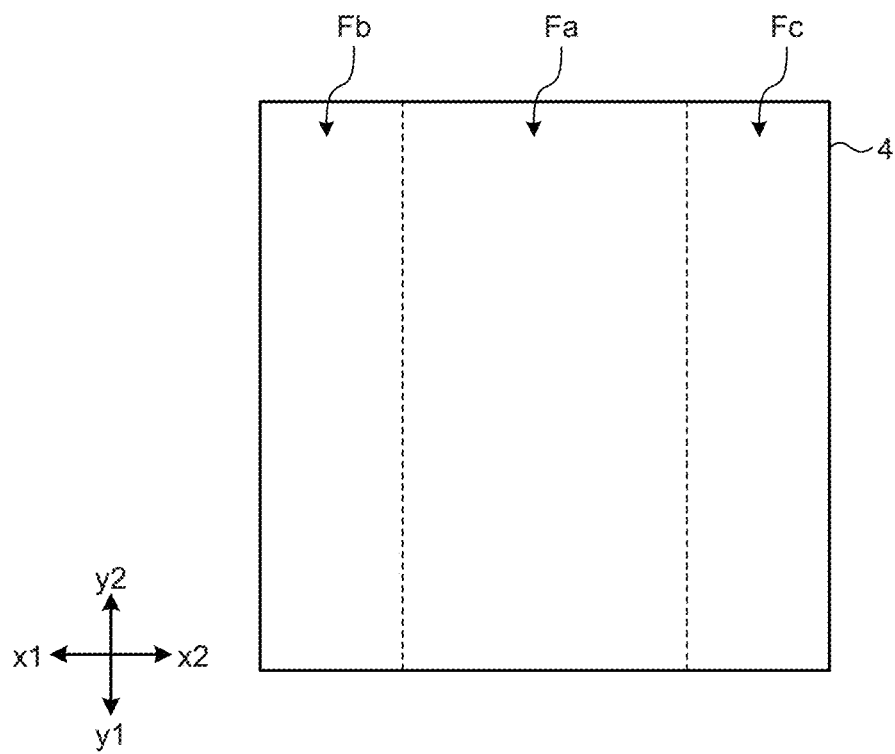
FIG. 12 is a schematic diagram illustrating an example of the arrangement of the light sources in the liquid crystal layer.

FIGS. 11 and 12 are schematic diagrams illustrating examples of the arrangement of the light sources in the liquid crystal layer 4. In the example illustrated in FIG. 11, the active region (region in which the liquid crystal layer 4 is provided) is bisected into a partial region F1 and a partial region F2. Any one type of light source (for example, the first light source 801) among the first light source 801, the second light source 802, and the third light source 803 is disposed in the partial region F1. Any one type of light source (for example, the second light source 802) different from that disposed in the partial region F1 among the first light source 801, the second light source 802, and the third light source 803 is disposed in the partial region F2.

In the example illustrated in FIG. 12, the active region (region in which the liquid crystal layer 4 is provided) is trisected into a partial region Fa, a partial region Fb, and a partial region Fc. Any one type of light source (for example, the first light source 801) among the first light source 801, the second light source 802, and the third light source 803 is disposed in the partial region Fa. Any one type of light source (for example, the second light source 802) different from that disposed in the partial region Fa among the first light source 801, the second light source 802, and the third light source 803 is disposed in the partial region Fb. One type of light source (for example, the third light source 803) not disposed in the partial region Fa nor the partial region Fb among the first light source 801, the second light source 802, and the third light source 803 is disposed in the partial region Fc.

In FIG. 11, the partial region F1 and the partial region F2 are arranged in the y direction. In FIG. 12, the partial region Fa, the partial region Fb, and the partial region Fc are arranged in the x direction. In these arrangement directions, however, the relation of the x and y directions may be inverted.

A light source (for example, the composite light source 810 illustrated in FIG. 13) configured to emit a plurality of kinds of light to one light distribution control region LDA may be disposed.

Figure 13:
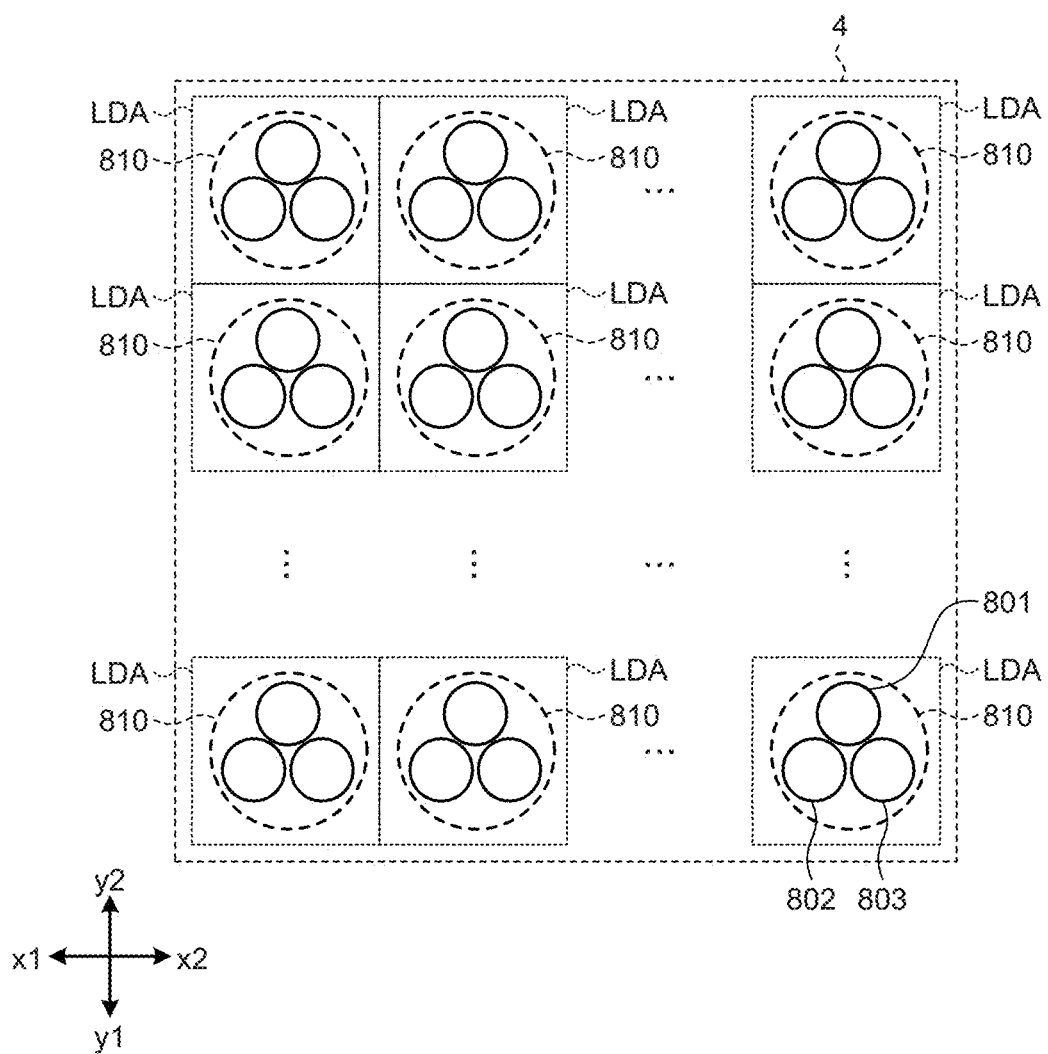
FIG. 13 is a schematic diagram illustrating the relation between the light distribution control regions and composite light sources at a plan viewpoint.

FIG. 13 is a schematic diagram illustrating the relation between the light distribution control regions LDA and the composite light sources 810 at a plan viewpoint. As illustrated in FIG. 13, one composite light source 810 may be provided in one light distribution control region LDA. One composite light source 810 includes one first light source 801, one second light source 802, and one third light source 803. Each composite light source 810 is provided to be able to turn on the first light source 801, the second light source 802, or the third light source 803 under control by the light source driver 65. It can be selected as appropriate which of the first light source 801, the second light source 802, and the third light source 803 included in each composite light source 810 is to be turned on and at what timing the light source is turned on. In the embodiment, two or more of the first light source 801, the second light source 802, and the third light source 803 included in one composite light source 810 are not controlled to be simultaneously turned on, but may be simultaneously turned on.

FIGS. 14, 15, 16, and 17 are schematic diagrams illustrating examples in which light distribution of each of the light sources is individually controlled by the liquid crystal light distributor 700. For example, in FIG. 14, the first light source 801 and the second light source 802 are alternately arranged in a direction (for example, the x direction or the y direction) orthogonal to the z direction. Although three first light sources 801 and three second light sources 802 are specifically illustrated in FIG. 14, the number of the first light sources 801 and the number of the second light sources 802 may be two or less or may be four or more. In the same manner, the numbers of the first light sources 801, the second light sources 802, the third light sources 803, and the composite light sources 810 exemplarily illustrated in FIGS. 15, 16, and 17 may be two or less or may be four or more.

Figure 14:
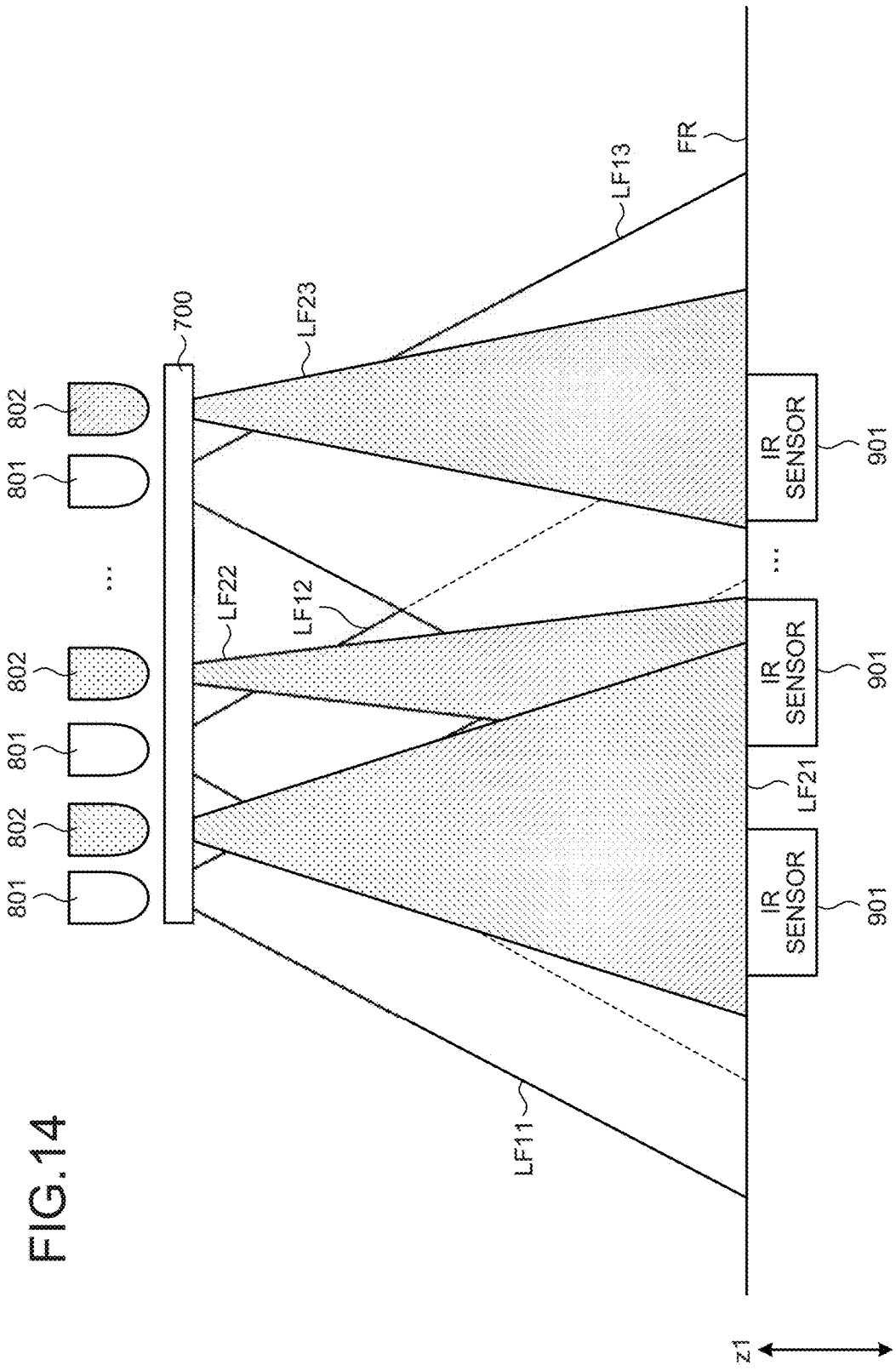
FIG. 14 is a schematic diagram illustrating an example in which light distributions of the respective light sources are individually controlled by the liquid crystal light distributor.

In FIG. 14, the emission region of light emitted from one of the three first light sources 801, subjected to orientation control by the liquid crystal light distributor 700, and incident on a floor FR is indicated as a light distribution region LF11. The emission region of light emitted from another one of the three first light sources 801, subjected to orientation control by the liquid crystal light distributor 700, and incident on the floor FR is indicated as a light distribution region LF12. The emission region of light emitted from the remaining one of the three first light sources 801, subjected to orientation control by the liquid crystal light distributor 700, and incident on the floor FR is indicated as a light distribution region LF13.

In FIG. 14, the emission region of light emitted from one of the three second light sources 802, subjected to orientation control by the liquid crystal light distributor 700, and incident on the floor FR is indicated as a light distribution region LF21. The emission region of light emitted from another one of the three second light sources 802, subjected to orientation control by the liquid crystal light distributor 700, and incident on the floor FR is indicated as a light distribution region LF22. The emission region of light emitted from the remaining one of the three second light sources 802, subjected to orientation control by the liquid crystal light distributor 700, and incident on the floor FR is indicated as a light distribution region LF23.

The region of the floor FR irradiated with the light distribution region LF12 is larger than the region of the floor FR irradiated with the light distribution region LF11. The region of the floor FR irradiated with the light distribution region LF21 is larger than the regions of the floor FR irradiated with the light distribution region LF22 and the light distribution region LF23. The regions of the floor FR irradiated with the light distribution regions LF21, LF22, and LF23 are smaller than the regions of the floor FR irradiated with the light distribution regions LF11, LF12, and LF13. In this manner, light distribution of each first light source 801 and each second light source 802 can be individually controlled by light distribution control for each light distribution control region LDA of the liquid crystal light distributor 700.

Figure 15:
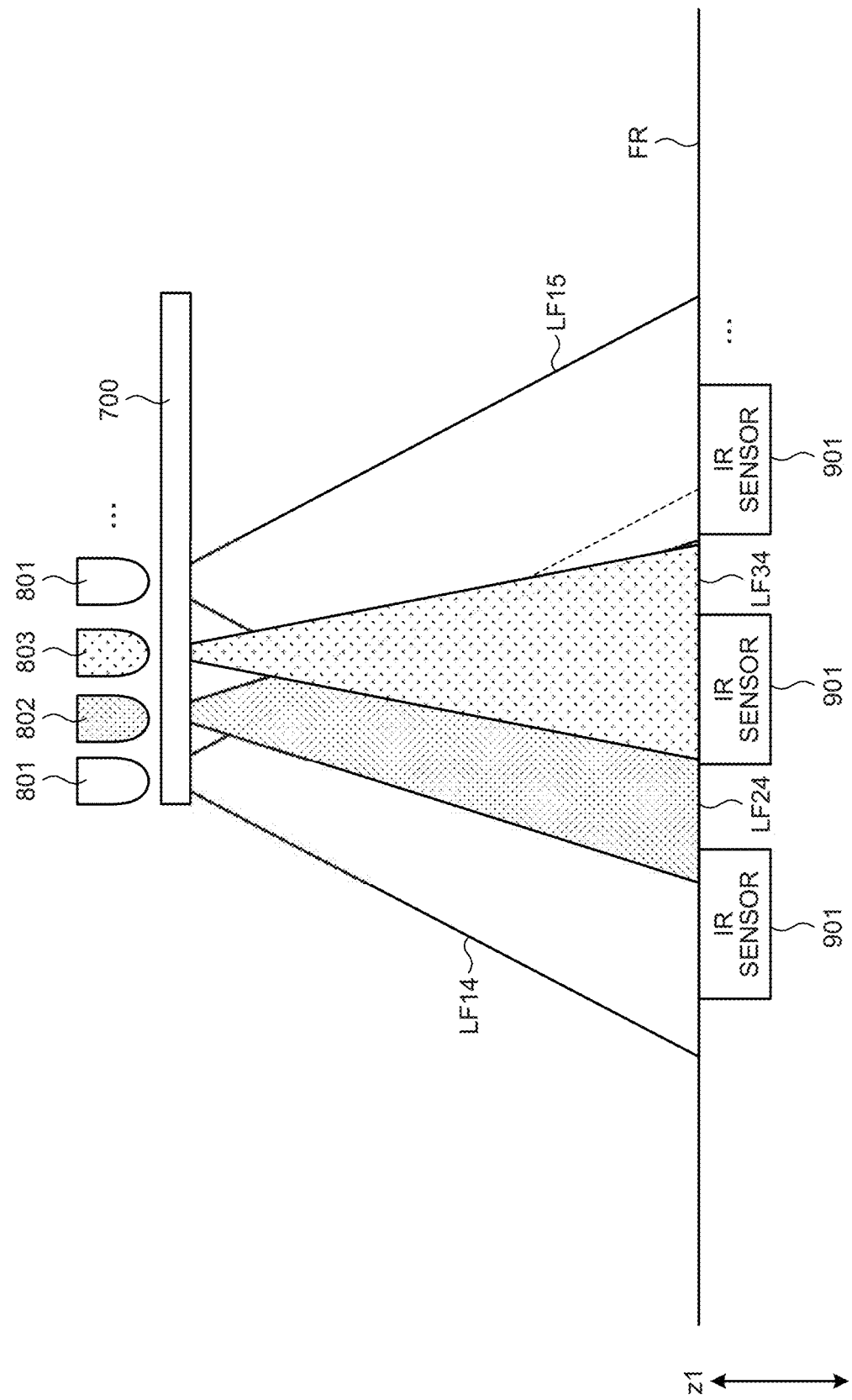
FIG. 15 is a schematic diagram illustrating an example in which light distributions of the respective light sources are individually controlled by the liquid crystal light distributor.

In FIG. 15, the first light source 801, the second light source 802, and the third light source 803 are periodically arranged in the stated order from one side toward the other side in a direction (for example, the x direction or the y direction) orthogonal to the z direction. In a case where the direction orthogonal to the z direction is the y direction, the example illustrated in FIG. 15 corresponds to the configuration described above with reference to FIG. 10.

In FIG. 15, two of the first light sources 801 are illustrated, and the emission region of light emitted from one of the two first light sources 801, subjected to orientation control by the liquid crystal light distributor 700, and incident on the floor FR is indicated as a light distribution region LF14. The emission region of light emitted from the other one of the two first light sources 801, subjected to orientation control by the liquid crystal light distributor 700, and incident on the floor FR is indicated as a light distribution region LF15.

In FIG. 15, the emission region of light emitted from the illustrated second light source 802, subjected to orientation control by the liquid crystal light distributor 700, and incident on the floor FR is indicated as a light distribution region LF24. In FIG. 15, the emission region of light emitted from the illustrated third light source 803, subjected to orientation control by the liquid crystal light distributor 700, and incident on the floor FR is indicated as a light distribution region LF34.

The region of the floor FR irradiated with the light distribution region LF24 is smaller than the regions of the floor FR irradiated with the light distribution regions LF14 and LF15. The region of the floor FR irradiated with the light distribution region LF34 is smaller than the region of the floor FR irradiated with the light distribution region LF24. In this manner, light distribution of each first light source 801, each second light source 802, and each third light source 803 can be individually controlled by light distribution control for each light distribution control region LDA of the liquid crystal light distributor 700.

In the examples illustrated in FIGS. 14 and 15, a plurality of the IR sensors 901 are provided on the floor FR. Each IR sensor 901 detects infrared light. The result of detection by each IR sensor 901 is different between a state in which no object exists in the light distribution regions LF21, LF22, or LF23 (or the light distribution region LF24) and a state in which an object exists in the light distribution regions LF21, LF22, or LF23 (or the light distribution region LF24). By utilizing this, whether an object exists in the light distribution regions LF21, LF22, or LF23 (or the light distribution region LF24) can be detected by the IR sensors 901. Each first light source 801 may be turned on when it is detected by the IR sensors 901 that an object exists in the light distribution regions LF21, LF22, or LF23 (or the light distribution region LF24), and the first light source 801 may be turned off when it is detected by the IR sensors 901 that no object exists in the light distribution regions LF21, LF22, or LF23 (or the light distribution region LF24). Such control is performed by the light source driver 65 under control by the MCU 62. In this manner, the controller 60 can determine based on an output from each IR sensor 901 whether an object exists and blocks infrared light between the IR sensor 901 and the liquid crystal light distributor 700, and can control operation of each first light source 801 depending on the existence or nonexistence of an object that blocks infrared light. Setting related to such turn-on control of the first light sources 801 based on infrared detection by the IR sensors 901 is performed by, for example, the information processing device 300 and held by the MCU 62.

In the example illustrated in FIG. 15, the third light source 803 may be turned off when it is detected by the IR sensors 901 that an object exists in the light distribution region LF24, and the third light source 803 may be turned on when it is detected by the IR sensors 901 that no object exists in the light distribution region LF24. In this manner, the controller 60 can determine based on an output from each IR sensor 901 whether an object exists and blocks infrared light between the IR sensor 901 and the liquid crystal light distributor 700, and can control operation of each third light source 803 depending on the existence or nonexistence of an object that blocks infrared light. Such control is performed by the light source driver 65 under control by the MCU 62. Setting related to such turn-on control of the third light sources 803 based on infrared detection by the IR sensors 901 is performed by, for example, the information processing device 300 and held by the MCU 62.

Figure 16:
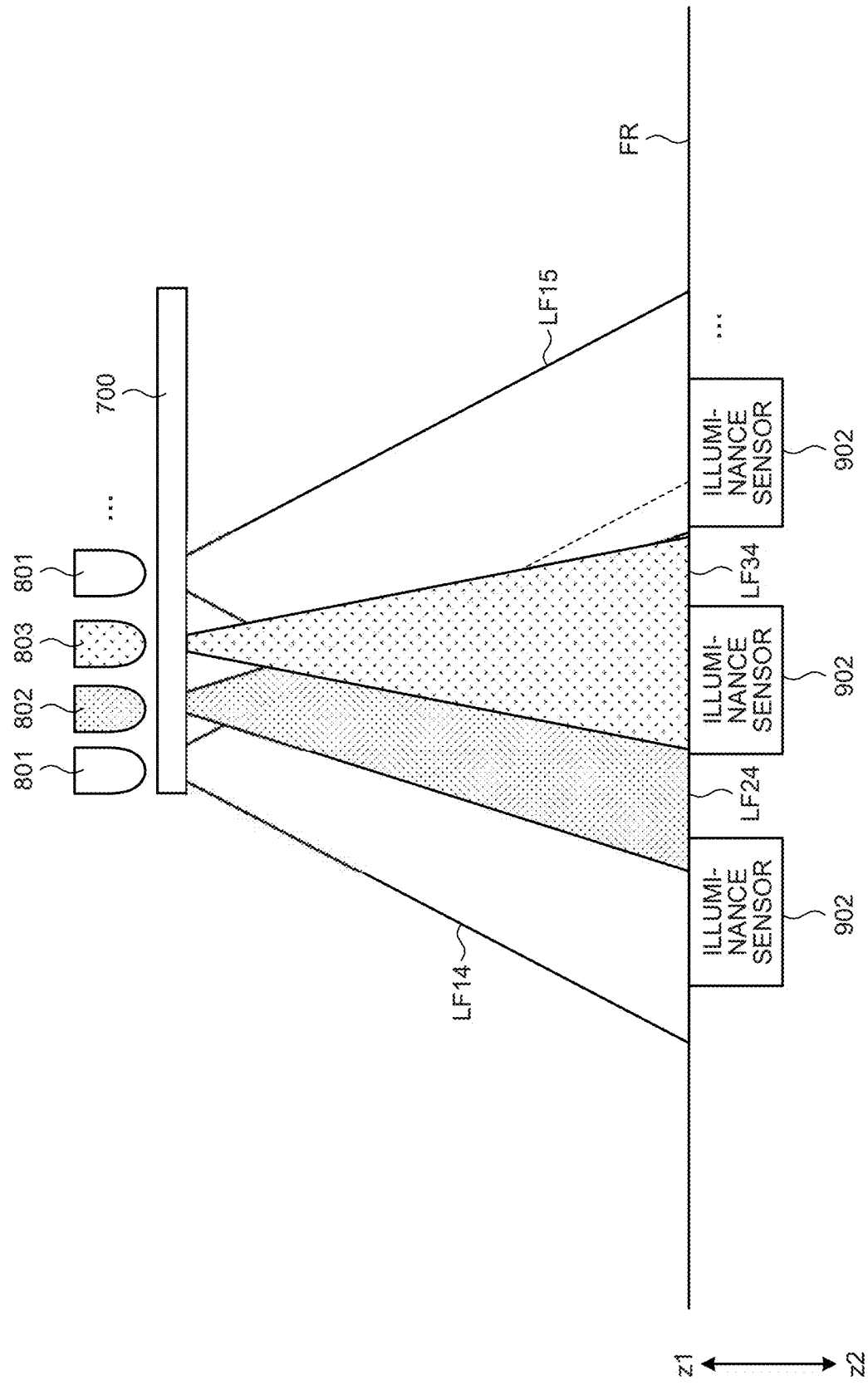
FIG. 16 is a schematic diagram illustrating an example in which light distributions of the respective light sources are individually controlled by the liquid crystal light distributor.

FIG. 16 illustrates an example in which the IR sensors 901 illustrated in FIG. 15 are replaced with illuminance sensors 902. The illuminance sensors 902 measure the illuminance of light from the first light sources 801. The illuminance sensors 902 are desirably disposed such that the illuminance of light from each first light source 801 can be individually measured. In measuring illuminance by the illuminance sensors 902, the MCU 62 may control light distribution through the liquid crystal light distributor 700 so that light from one first light source 801 is incident in a region in which one illuminance sensor 902 is provided. Information indicating the results of the measurement by the illuminance sensors 902 is output to the MCU 62. The MCU 62 controls the light emission intensity of each first light source 801 based on the illuminance of the first light source 801, which is measured by the illuminance sensors 902. Specifically, the MCU 62 controls the light emission intensity of each first light source 801 so that the illuminance measured by the illuminance sensors 902 becomes a predetermined light illuminance. For example, the light emission intensity of each first light source 801 gradually decreases with long-term use in some cases even though power supply is constant. In such a case, the decrease of the light emission intensity can be compensated by increasing supply power (current). Thus, in the example illustrated in FIG. 16, the MCU 62 performs feedback control based on the illuminance measurement by the illuminance sensors 902 and controls supply power so that the light emission intensity becomes constant.

The illuminance sensors 902 may further have functions to measure the intensity of infrared light from the second light sources 802 and the intensity of ultraviolet light from the third light sources 803, or dedicated sensors configured to measure at least one of these intensities may be provided separately from the illuminance sensors 902. Feedback control may be performed based on such intensity measurement of infrared light and ultraviolet light, and the MCU 62 may control the light emission intensities of the second light sources 802 and the third light sources 803 so that the intensities of infrared light and ultraviolet light become constant.

Color temperature sensors may be provided on the floor FR in place of or in addition to the illuminance sensors 902. In other words, each sensor 900 may include a color temperature sensor. The color temperature sensor measures the color temperature of light. In this case, the light source device 80 includes a plurality of first light sources 801 corresponding to a plurality of colors such as red (R), green (G), and blue (B). Information transmitted from the information processing device 300 to the communicator 61 includes setting related to the color temperature of light to be emitted from the light source device 80. The controller 60 performs turn-on control of each first light source 801 included in the light source device 80 so that light having a color temperature corresponding to the setting is emitted. In addition, each color temperature sensor measures the color temperature of light incident on the floor FR and feeds back an output indicating a result of the measurement to the controller 60. The controller 60 performs turn-on control of each first light source 801 based on the feedback. Accordingly, more highly accurate color temperature control of light can be achieved.

Figure 17:
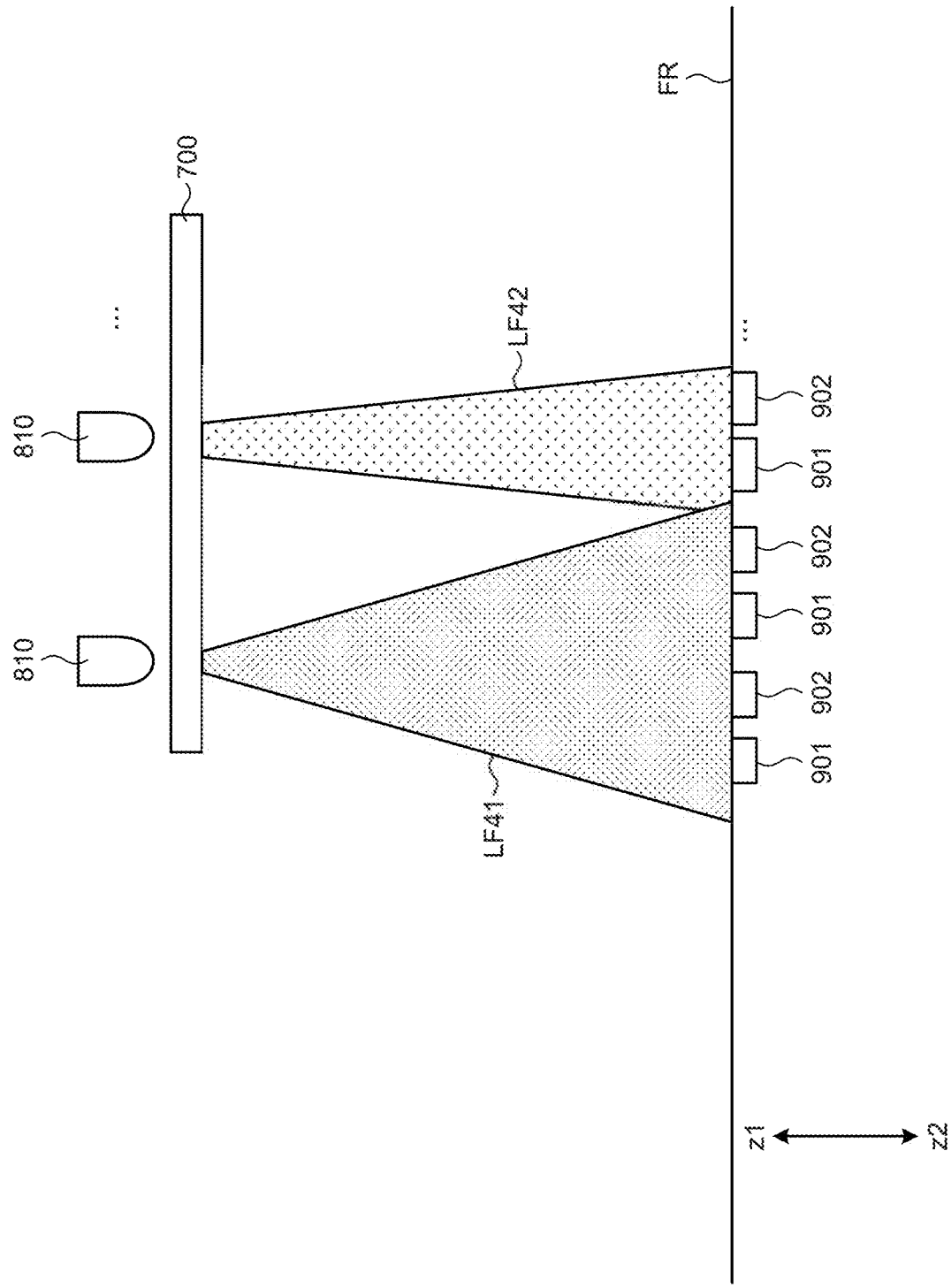
FIG. 17 is a schematic diagram illustrating an example in which light distributions of the respective light sources are individually controlled by the liquid crystal light distributor.

FIG. 17 illustrates an example in which a plurality of composite light sources 810 are disposed in a direction orthogonal to the z direction (for example, the x direction or the y direction). In FIG. 17, two composite light sources 810 are illustrated. The emission region of light emitted from one of the two composite light sources 810, subjected to orientation control by the liquid crystal light distributor 700, and incident on the floor FR is indicated as a light distribution region LF41. The emission region of light emitted from the other of the two composite light sources 810, subjected to orientation control by the liquid crystal light distributor 700, and incident on the floor FR is indicated as a light distribution region LF42. The region of the floor FR irradiated with the light distribution region LF42 is smaller than the region of the floor FR irradiated with the light distribution region LF41. In this manner, light distribution of each composite light source 810 can be individually controlled by light distribution control for each light distribution control region LDA of the liquid crystal light distributor 700. In the example illustrated in FIG. 17, light incident on the floor FR in each of the light distribution regions LF41 and LF42 may be light emitted by any of the first, second, and third light sources 801, 802, and 803.

As illustrated in FIG. 17, the IR sensors 901 and the illuminance sensors 902 may be both provided on the floor FR. According to the example illustrated in FIG. 17, it is possible to achieve both the light control based on infrared detection by the IR sensors 901, which is described above with reference to FIGS. 14 and 15, and the light emission intensity control based on illuminance measurement by the illuminance sensors 902, which is described above with reference to FIG. 16. Alternatively, in the example illustrated in FIG. 17, the IR sensors 901 or the illuminance sensors 902 may be omitted. As in the example illustrated in FIG. 17, the IR sensors 901 and the illuminance sensors 902 may be both provided on the floor FR in the configuration described above with reference to FIGS. 14 to 16 in which the first light sources 801, the second light sources 802 (or the first light sources 801, the second light sources 802, and the third light sources 803) are provided, as well. In the example illustrated in FIG. 14, the illuminance sensors 902 may be provided in place of the IR sensors 901.

In the description of FIGS. 10 to 17, setting of light distribution of light from each light source 800 (first light source 801, second light source 802, third light source 803, or composite light source 810) is determined in advance. For example, information indicating the setting is included in information transmitted from the information processing device 300, and the MCU 62 controls operation of the liquid crystal light distributor 700 based on the information, thereby achieving light distribution in accordance with the setting. In this example, the status of light distribution can be updated by updating the setting that is transmitted from the information processing device 300.

Figure 18:
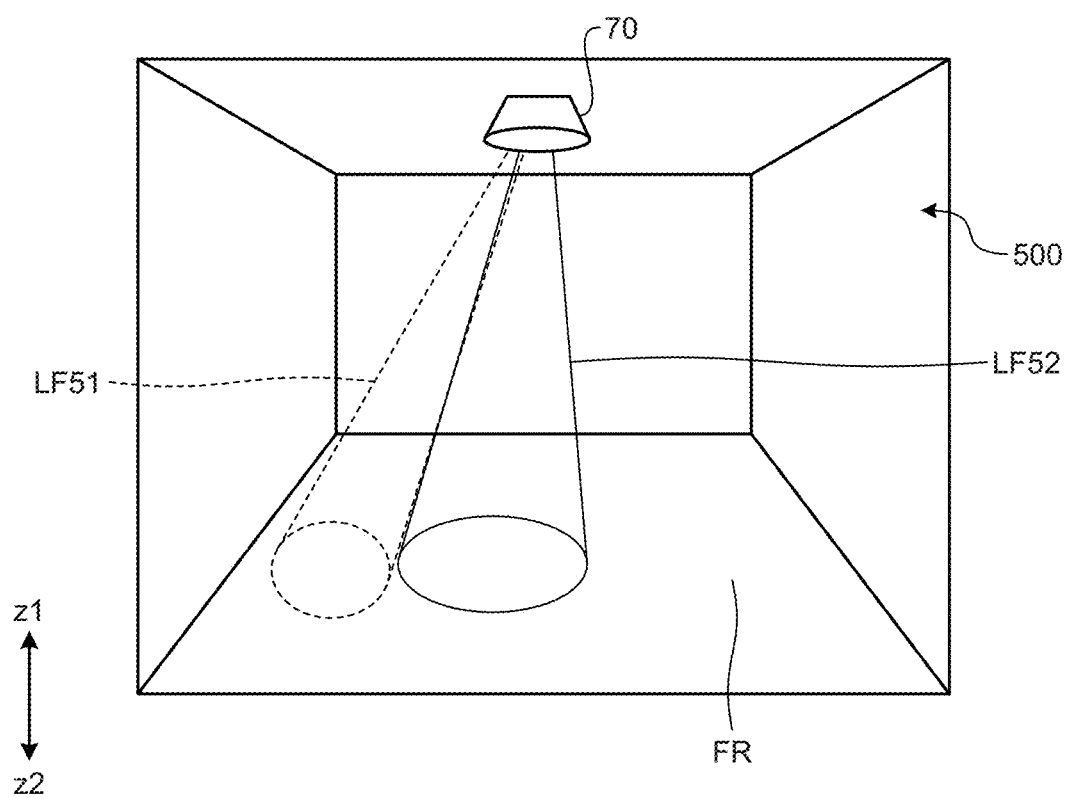
FIG. 18 is a schematic diagram illustrating the region of light distribution of the light source unit provided in a room.

FIG. 18 is a schematic diagram illustrating light distribution regions LF51 and LF52 of the light source unit 70 provided in a room 500. As illustrated in FIG. 18, the light source unit 70 is provided on, for example, the ceiling of the room 500. Light from each of the plurality of light sources 800 included in the light source device 80 of the light source unit 70 can be individually controlled like the light distribution regions LF51 and LF52 illustrated in FIG. 18, for example. In this manner, according to the embodiment, light distribution can be more flexibly controlled.

In the example illustrated in FIG. 18, the IR sensors 901, the illuminance sensors 902, or both are provided on the floor FR as components of the sensor unit 90 (not illustrated), and the same light control as in the examples described above with reference to FIGS. 14 to 17 is performed.

As described above, according to the embodiment, an illumination device (illumination device 50) includes a light distribution controller (light source unit 70) having a light distribution control region (light distribution control region LDA) in which a transmission region of light is changeable, a plurality of types of light sources (light sources 800) each disposed at a position facing the light distribution controller, and a controller (controller 60) configured to control operation of the light distribution controller and the plurality of types of light sources. The light distribution controller includes a plurality of liquid crystal panels (liquid crystal light distribution panels 1) stacked in a facing direction of the light distribution controller and the light sources. According to the embodiment, the light distribution control region of the light distribution controller including the plurality of liquid crystal panels is provided to allow change of the transmission region of light, and thus it is possible to control light distribution of the plurality of types of light sources without changing the orientation of each of the plurality of types of light sources. Accordingly, control of light distribution of the plurality of types of light sources can be more easily performed.

The liquid crystal panels (liquid crystal light distribution panels 1) each include a first substrate (array substrate 2), a second substrate (counter substrate 3), and a liquid crystal layer (liquid crystal layer 4). The first substrate is provided with a plurality of first electrodes (first electrodes 25) extending in one direction (for example, the x direction) along a plane orthogonal to the facing direction (z direction) and arranged in another direction (for example, the y direction) orthogonal to the facing direction and the one direction. The second substrate is provided with a plurality of second electrodes (second electrodes 33) extending in the other direction and arranged in the one direction. The liquid crystal layer is sealed between the first substrate and the second substrate. With this configuration, the liquid crystal panels can be achieved with which the transmission region of light traveling from one surface side toward the other surface side can be easily controlled. In other words, easier light distribution control can be achieved by the light distribution controller (liquid crystal light distributor 700) including the liquid crystal panels.

The plurality of types of light sources (light sources 800) include a visible light source (first light source 801) and an invisible light source (for example, second light source 802 or third light source 803). With this configuration, it is possible to provide the illumination device that can more easily perform light distribution control of each of light from the visible light source and light from the invisible light source.

Light emitted by the invisible light source (third light source 803) includes ultraviolet light. Accordingly, it is possible to provide the illumination device that can control, by light distribution control, the application region of chemical effects (such as disinfection and sterilization) of ultraviolet light.

Light emitted by the invisible light source (second light source 802) includes infrared light. Accordingly, it is possible to provide the illumination device that can set, by light distribution control, the application region of control by using infrared light (for example, detection of entry to the emission region of infrared light).

The light distribution controller (liquid crystal light distributor 700) has one surface and another surface. The one surface of the light distribution controller faces the light sources, and the other surface of the light distribution controller is positioned opposite the one surface of the light distribution controller. The illumination device further includes a sensor (sensor 900) disposed at a position facing the other surface of the light distribution controller. The sensor is capable of detecting at least one type of light among a plurality of types of light emitted by the plurality of types of light sources (light sources 800). The controller (controller 60) controls operation of one type or more of the plurality of types of light sources (light sources 800) based on an output from the sensor. With this configuration, it is possible to provide the illumination device the operation of which can be controlled based on the output from the sensor.

The sensor (IR sensor 901) detects infrared light, and the controller (controller 60) determines whether an object exists and blocks infrared light between the sensor and the light distribution controller (liquid crystal light distributor 700) based on an output from the sensor, and controls operation of the visible light source (first light source 801) depending on the existence or nonexistence of an object that blocks infrared light. Accordingly, turn-on control of the visible light source can be automated.

Light emitted by the invisible light sources (second light source 802 and third light source 803) includes infrared light and ultraviolet light, the sensor (IR sensor 901) detects infrared light, and the controller (controller 60) determines whether an object exists and blocks infrared light between the sensor and the light distribution controller (liquid crystal light distributor 700) based on an output from the sensor, and controls operation of the invisible light source (third light source 803) that emits ultraviolet light depending on the existence or nonexistence of an object that blocks infrared light. With this configuration, turn-on control of the invisible light source that emits ultraviolet light can be automated.

The light sources 800 are not limited to the above-described first, second, and third light sources 801, 802, and 803. The light sources 800 may include a light source configured to emit another type of invisible light. The specific structure of the liquid crystal light distributor 700 is not limited to the example described above with reference to FIG. 8. For example, the liquid crystal light distributor 700 may include a liquid crystal panel that functions as what is called a liquid crystal lens provided to allow change of the refraction degree of light traveling from one surface side toward the other surface side by light distribution control of liquid crystals.

Turn-on control of the light sources 800 is not limited to control based on sensor output. For example, the control may be performed such that a period in which one of a plurality of types of light sources is on and a period in which another one is on are alternately repeated. In other words, light sources to be turned on may be periodically changed in order.

A polarization plate may be provided on the emission path of light emitted from the light source device 80 to limit light emission from a plurality of types of light sources. For example, the limitation is such that light (for example, P wave) in one polarization direction is emitted from one of the plurality of types of light sources, and light (for example, S wave) in another polarization direction different from the one polarization direction is emitted from another one. In this case, a polarization plate that transmits light in the one polarization direction and blocks light in the other polarization direction may be provided on the emission path of light emitted from the one light source, and a polarization plate that transmits light in the other polarization direction and blocks light in a polarization direction different from the other polarization direction may be provided on the emission path of light emitted from the other light source. Accordingly, the emission region of light emitted from each of the plurality of types of light sources can be more reliably limited.

The optical paths of a plurality of types of light sources may be merged using an optical member. In this case, for example, a prism is employed as the optical member. Each of the plurality of types of light sources emits light to the optical member. The optical member is made up of a prism or a combination of a plurality of prisms shaped so that the emission paths of light emitted from the plurality of respective types of light sources overlap each other. With this configuration, one light distribution control region LDA can be shared by the plurality of types of light sources.

A stacking method in a case where the liquid crystal light distributor 700 is made up of a plurality of liquid crystal light distribution panels 1 is not limited to the configuration described above with reference to FIG. 8. For example, a first liquid crystal light distribution panel 1 and a second liquid crystal light distribution panel 1 may be alternately arranged in the z direction. The first liquid crystal light distribution panel 1 is a liquid crystal light distribution panel 1 in a first orientation in which the array substrate 2 is positioned on the z2 direction side and the counter substrate 3 is positioned on the z1 direction side, and the second liquid crystal light distribution panel 1 is a liquid crystal light distribution panel 1 in a second orientation in which the array substrate 2 is positioned on the z1 direction side and the counter substrate 3 is positioned on the z2 direction side. In this case, the plurality of liquid crystal light distribution panels 1 are stacked such that the liquid crystal layer 4 of the first liquid crystal light distribution panel 1 in the first orientation and the liquid crystal layer 4 of the second liquid crystal light distribution panel 1 in the second orientation overlap each other. The fifth pad 109, the sixth pad 110, the seventh pad 111, and the eighth pad 112 are referred to as a first terminal portion. The thirteenth pad 209, the fourteenth pad 210, the fifteenth pad 211, and the sixteenth pad 212 are referred to as a second terminal portion. In this case, it is preferred that the first terminal portion included in the first liquid crystal light distribution panel 1 in the first orientation and the second terminal portion included in the second liquid crystal light distribution panel 1 in the second orientation face each other in the z direction, and that the second terminal portion included in the first liquid crystal light distribution panel 1 in the first orientation and the first terminal portion included in the second liquid crystal light distribution panel 1 in the second orientation face each other in the z direction. Accordingly, wiring that couples the first terminal portion included in the first liquid crystal light distribution panel 1 in the first orientation and the first terminal portion included in the second liquid crystal light distribution panel 1 in the second orientation, and wiring that couples the second terminal portion included in the first liquid crystal light distribution panel 1 in the first orientation and the second terminal portion included in the second liquid crystal light distribution panel 1 in the second orientation can be easily provided in the z direction. In one of the first liquid crystal light distribution panel 1 in the first orientation and the second liquid crystal light distribution panel 1 in the second orientation, the four terminals of "the first pad 105, the second pad 106, the third pad 107, and the fourth pad 108" are coupled to the four terminals of "the fifth pad 109, the sixth pad 110, the seventh pad 111, and the eighth pad 112" through wiring lines, thereby forming four signal transmission paths. In addition, in the one of the first and second liquid crystal light distribution panels 1, the four terminals of "the ninth pad 205, the tenth pad 206, the eleventh pad 207, and the twelfth pad 208" are coupled to the four terminals of "the thirteenth pad 209, the fourteenth pad 210, the fifteenth pad 211, and the sixteenth pad 212" through wiring lines, thereby forming four signal transmission paths. With this configuration, signals can be transmitted from the four terminals of "the first pad 105, the second pad 106, the third pad 107, and the fourth pad 108" in the other of the first and second liquid crystal light distribution panels 1 to the four terminals of "the fifth terminal 201, the sixth terminal 202, the seventh terminal 203, and the eighth terminal 204" in the one liquid crystal light distribution panel 1. In addition, signals can be transmitted from the four terminals of "the ninth pad 205, the tenth pad 206, the eleventh pad 207, and the twelfth pad 208" in the other liquid crystal light distribution panel 1 to the four terminals of "the first terminal 101, the second terminal 102, the third terminal 103, and the fourth terminal 104" in the one liquid crystal light distribution panel 1. Thus, when an FPC 40 is coupled to the other liquid crystal light distribution panel 1, it is possible to form not only signal transmission paths to the other liquid crystal light distribution panel 1 but also signal transmission paths to the one liquid crystal light distribution panel 1, which leads to further reduction in the number of wiring lines extending from the plurality of liquid crystal light distribution panels 1.

Other effects that are achieved by aspects described above in the present embodiment and obvious from description of the present specification or can be thought of by the skilled person in the art as appropriate should be considered as effects achieved by the present disclosure.

What is claimed is:
1. An illumination device comprising:
a light distribution controller having a light distribution control region in which a transmission region of light is changeable;
a plurality of types of light sources each disposed at a position facing the light distribution controller; and
a controller configured to control operation of the light distribution controller and the plurality of types of light sources, wherein
the light distribution controller includes a plurality of liquid crystal panels each including
a first substrate provided with a plurality of first electrodes extending in one direction along a plane orthogonal to the facing direction and arranged in another direction orthogonal to the facing direction and the one direction,
a second substrate provided with a plurality of second electrodes extending in the other direction and arranged in the one direction, and
a liquid crystal layer sealed between the first substrate and the second substrate,
in the light distribution controller including the liquid crystal panels each including:
the first substrate, which is provided with the first electrodes each extending in the first direction;
and the second substrate, which is provided with the second electrodes each extending in the second direction orthogonal to the first direction; which are alternately stacked in a facing direction of the light distribution controller and the light sources,
the light distribution control region is a region in which the first electrodes and the second electrodes are disposed at a plan viewpoint,
the light distribution control region controls the transmission region and a transmission degree of light traveling from one surface side of the light distribution controller toward another surface side thereof by controlling a potential of each of the first electrodes and the second electrodes of the liquid crystal panels included in the light distribution controller,
in a case where potentials of the first electrodes and the second electrodes are all zero volt, light from the light sources transmit through the light distribution control region without substantial change, and
in a case where potentials of the first electrodes are zero volt and potentials of the second electrodes exceed zero volt, the light distribution is controlled so that a state of the light distribution control region, when viewed at the plan viewpoint from a side facing the light sources, is such that light from the light sources spreads larger in the one direction than light from the light sources spreads in the other direction wherein the plurality of types of light sources include a visible light source and an invisible light source; and wherein the light distribution controller has one surface and another surface, the one surface of the light distribution controller faces the light sources, the other surface of the light distribution controller is positioned opposite the one surface of the light distribution controller, the illumination device further comprises a sensor disposed at a position facing the other surface of the light distribution controller, the sensor is capable of detecting at least one type of light among a plurality of types of light emitted by the plurality of types of light sources, and the controller controls operation of one type or more of the plurality of types of light sources based on an output from the sensor.

2. The illumination device according to claim 1, wherein light emitted by the invisible light source includes ultraviolet light.

3. The illumination device according to claim 1, wherein light emitted by the invisible light source includes infrared light.

4. The illumination device according to claim 2, wherein the sensor detects infrared light, and the controller determines whether an object exists and blocks infrared light between the sensor and the light distribution controller based on an output from the sensor, and controls operation of the visible light source depending on existence or nonexistence of an object that blocks infrared light.

5. The illumination device according to claim 1, wherein light emitted by the invisible light source includes ultraviolet light, the sensor detects infrared light, and the controller determines whether an object exists and blocks infrared light between the sensor and the light distribution controller based on an output from the sensor, and controls operation of the invisible light source that emits ultraviolet light depending on existence or nonexistence of an object that blocks infrared light.

6. The illumination device according to claim 1, wherein in a case where potentials of the first electrodes exceed zero volt and potentials of the second electrodes are zero volt, the light distribution is controlled so that a state of the light distribution control region, when viewed at the plan viewpoint from a side facing light sources, is such that light from the light sources spreads larger in the other direction than light from the light sources spreads in the one direction.

7. An illumination device comprising:

a light distribution controller having a light distribution control region in which a transmission region of light is changeable;

a plurality of types of light sources each disposed at a position facing the light distribution controller; and a controller configured to control operation of the light distribution controller and the plurality of types of light sources, wherein the light distribution controller includes a plurality of liquid crystal panels each including a first substrate provided with a plurality of first electrodes extending in one direction along a plane orthogonal to the facing direction and arranged in another direction orthogonal to the facing direction and the one direction, a second substrate provided with a plurality of second electrodes extending in the other direction and arranged in the one direction, and a liquid crystal layer sealed between the first substrate and the second substrate, in the light distribution controller including the liquid crystal panels each including: the first substrate, which is provided with the first electrodes each extending in the first direction; and the second substrate, which is provided with the second electrodes each extending in the second direction orthogonal to the first direction; which are alternately stacked in a facing direction of the light distribution controller and the light sources, the light distribution control region is a region in which the first electrodes and the second electrodes are disposed at a plan viewpoint, the light distribution control region controls the transmission region and a transmission degree of light traveling from one surface side of the light distribution controller toward another surface side thereof by controlling a potential of each of the first electrodes and the second electrodes of the liquid crystal panels included in the light distribution controller, in a case where potentials of the first electrodes and the second electrodes are all zero volt, light from the light sources transmit through the light distribution control region without substantial change, and in a case where potentials of the first electrodes exceed zero volt and potentials of the second electrodes are zero volt, the light distribution is controlled so that a state of the light distribution control region, when viewed at the plan viewpoint from a side facing the light sources, is such that light from the light sources spreads larger in the other direction than light from the light sources spreads in the one direction wherein the plurality of types of light sources include a visible light source and an invisible light source; and wherein the light distribution controller has one surface and another surface, the one surface of the light distribution controller faces the light sources, the other surface of the light distribution controller is positioned opposite the one surface of the light distribution controller, the illumination device further comprises a sensor disposed at a position facing the other surface of the light distribution controller, the sensor is capable of detecting at least one type of light among a plurality of types of light emitted by the plurality of types of light sources, and the controller controls operation of one type or more of the plurality of types of light sources based on an output from the sensor.

8. The illumination device according to claim 7, wherein in a case where potentials of the first electrodes are zero volt and potentials of the second electrodes exceed zero volt, the light distribution is controlled so that a state of the light distribution control region, when viewed at the plan viewpoint from a side facing light sources, is such that light from the light sources spreads larger in the one direction than light from the light sources spreads in the other direction.

* * * * *